(12) United States Patent
Mouilleseaux et al.

(10) Patent No.: US 9,390,169 B2
(45) Date of Patent: Jul. 12, 2016

(54) ANNOTATION OF MOVIES

(75) Inventors: Jean-Pierre M. Mouilleseaux, Venice, CA (US); Charles J. Migos, San Francisco, CA (US)

(73) Assignee: APPLE INC., Cupertino, CA (US)

(*) Notice: Subject to any disclaimer, the term of this patent is extended or adjusted under 35 U.S.C. 154(b) by 1608 days.

(21) Appl. No.: 12/164,037

(22) Filed: Jun. 28, 2008

(65) Prior Publication Data
US 2009/0327856 A1 Dec. 31, 2009

(51) Int. Cl.
G06F 3/048 (2013.01)
G06F 17/30 (2006.01)
G06F 3/0484 (2013.01)
G06F 17/24 (2006.01)
G11B 27/034 (2006.01)
G06F 3/0488 (2013.01)

(52) U.S. Cl.
CPC ........ G06F 17/30781 (2013.01); G06F 3/0484 (2013.01); G06F 17/241 (2013.01); G11B 27/034 (2013.01); *G06F 3/04883* (2013.01)

(58) Field of Classification Search
CPC .............. G06F 3/048–3/048886; G06F 17/241
USPC .................................................. 715/230–233
See application file for complete search history.

(56) References Cited

U.S. PATENT DOCUMENTS

| 5,583,980 | A  | * | 12/1996  | Anderson ...................... 345/473 |
| 5,600,775 | A  | * | 2/1997   | King et al. .................... 715/203 |
| 6,404,978 | B1 |   | 6/2002   | Abe |
| 6,424,743 | B1 | * | 7/2002   | Ebrahimi ...................... 382/189 |
| 7,111,230 | B2 | * | 9/2006   | Euchner et al. .............. 715/232 |
| 7,120,902 | B2 | * | 10/2006  | Flanagan et al. ............. 717/130 |
| 7,366,979 | B2 | * | 4/2008   | Spielberg et al. ............ 715/230 |
| 2003/0049015 | A1 |   | 3/2003 | Cote et al. |
| 2004/0090462 | A1 |   | 5/2004 | Graham |
| 2004/0205515 | A1 |   | 10/2004 | Socolow et al. |
| 2005/0289452 | A1 |   | 12/2005 | Kashi et al. |
| 2007/0136656 | A1 | * | 6/2007 | Nydam et al. ................ 715/512 |
| 2007/0266304 | A1 | * | 11/2007 | Fletcher et al. ........... 715/500.1 |
| 2008/0115063 | A1 |   | 5/2008 | Glenn |
| 2008/0292265 | A1 |   | 11/2008 | Worthen |
| 2012/0033948 | A1 |   | 2/2012 | Rodriguez et al. |

FOREIGN PATENT DOCUMENTS

WO    WO 2009/026159    2/2009

OTHER PUBLICATIONS

"Special Edition Using Microsoft Office XP" by Bott, E., Leonhard, W., May 2001, Que Publishing, pp. 104-105.*
Cowart, R., Knittel, B., "Special Edition Using Microsoft Windows XP Professional, Third Edition" , 2004, Que, Chapter 5, Section "Paint".*

* cited by examiner

*Primary Examiner* — Claudia Dragoescu
(74) *Attorney, Agent, or Firm* — Adeli LLP

(57) ABSTRACT

A method of annotating a digital clip and setting a duration over which the annotation applies is disclosed. The method provides a graphical user interface (GUI) with a display area for displaying the digital clip. The GUI provides controls for entering notes, including graphical notes, on the clip. The GUI also provides controls for setting the duration for which the annotation applies.

12 Claims, 19 Drawing Sheets

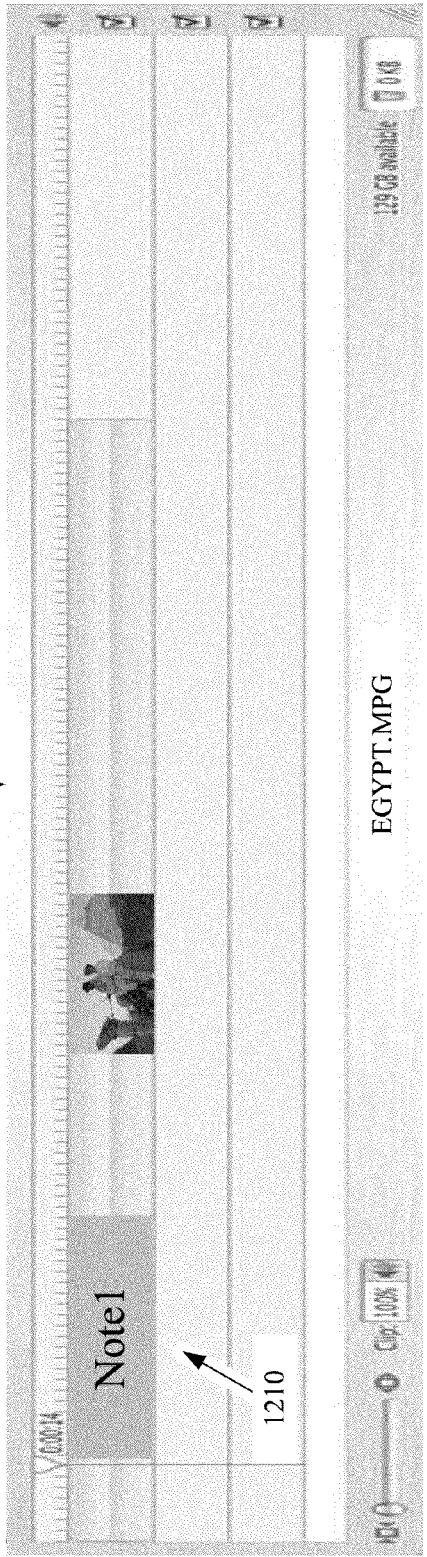
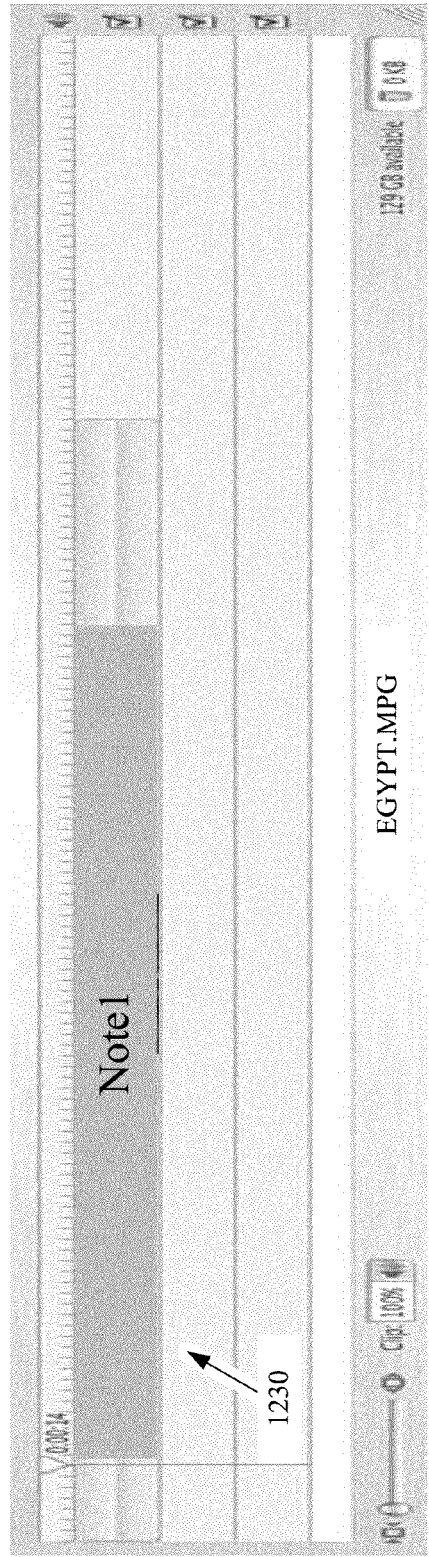
FIGURE 12A
FIGURE 12B

ANNOTATION OF MOVIES

FIELD OF THE INVENTION

The invention is directed toward providing annotating systems for audio/video clips. Specifically, this invention is directed toward providing a system for making annotations overlain on video clips.

BACKGROUND OF THE INVENTION

In the movie, television, and audio/video production industry, directors often give instructions for the editing of audio/video clips, such as scenes in movies. Such instructions were previously written or typed independently of the video clip to which they referred. The technicians following the instructions had to determine the times in the clip to which a given instruction was meant to apply based on the typed or written notes themselves.

In order for the technicians to determine to which part of a clip an instruction referred, the written or typed instructions had to include the times within the clip that each instruction applied to. These notes had to be meticulous in order to avoid expensive editing mistakes. Taking careful notes of these times made annotating video clips more complicated, however, notes made without accurate time notations increased the chances of misunderstanding between the director and the technicians. Such misunderstandings lead to wasted time for both the technicians and directors.

Accordingly, a video annotating system that automatically keeps track of annotations for film clips and stores the information in an accessible way would be useful.

SUMMARY OF THE INVENTION

Some embodiments allow a user to annotate digital clips (e.g., video clips, audio clips, or other media clips) and set a duration over which an annotation applies. An annotation is a message from a person making the annotation to one or more people reading, hearing, or seeing the annotation. Annotations of some embodiments can be textual, auditory, graphical, or some combination of such elements. Different annotations for a digital clip may be relevant over different durations of the clip. Accordingly, as mentioned above, some embodiments allow a user to set a duration within a clip (e.g., starting three minutes into the clip and lasting ten seconds) for an annotation for a digital clip. Some embodiments play digital clips that have been annotated. In some such embodiments, if a portion of the digital clip corresponding to the duration of an annotation is played or displayed, then the embodiment also plays or displays the corresponding annotation.

Various embodiments allow users to make various types of annotations including graphical annotations, text annotations, and audio annotations. In some embodiments, a digital clip is played or otherwise presented to a user, and the user can enter annotation of the digital clip while it plays. Some embodiments pause the playing of a digital clip while annotations for the clip are entered.

Some embodiments provide a graphical user interface (GUI) that includes tools or controls that allow a user to enter and edit annotations for a digital clip. For example, the GUI of some embodiments provides controls that allow a user to make an annotation that includes one or more graphical images (e.g. drawings). Some embodiments allow a user to make such a drawing by using a cursor control device (e.g., a graphics tablet). The GUIs of some embodiments provide controls for setting one or more characteristics of lines (e.g., thickness, color, etc.) in a drawing. In some such embodiments, the GUI provides a display area (e.g., an area displaying a frame of a video clip) that the user can draw on using the cursor control device.

Some embodiments can receive text annotations typed on a keyboard or converted from handwritten or audio annotations to text. While converting handwritten annotations, some embodiments use various characteristics of hand-drawn annotations to distinguish between hand-drawn written text and hand-drawn graphical annotations. Once an annotation is converted to text, some embodiments add copies of the text or data about the text to a list of annotations that a user can read and/or search.

As mentioned above, different annotations may be relevant during different durations in the clip. The duration of an annotation is a time in the digital clip over which the annotation applies. To allow users to set the durations over which annotations apply, some embodiments provide controls or tools for setting a duration for an annotation. Some embodiments provide editable bars on timelines to let a user set the duration of the annotation. Setting the duration determines how long an annotation will be displayed when a digital clip is played with annotations.

Some embodiments play an annotated digital clip while displaying one or more annotations (made for the clip) during the times within the clip to which the annotations apply. The GUIs of some embodiments can display annotations with digital clips, and can also display digital clips while hiding the annotation. The GUIs of some such embodiments provide a GUI control for determining whether to show or hide annotations while playing the video clip. In addition to receiving and/or displaying annotations, some embodiments can also save annotations.

Various embodiments provide various ways of saving the received annotations. For example, in some embodiments, the received annotations can be saved as metadata associated with one or more frames of the video clip. The received annotations in some embodiments can also be saved as a file that is separate from the video clip but temporally synched with the video clip. Some embodiments can generate annotated versions of digital clips. The annotated versions of some embodiments allow a user to view (and/or hear) the clip's associated annotations while playing the clip on a video annotating system of some embodiments or on a third party player after saving the annotations.

BRIEF DESCRIPTION OF THE DRAWINGS

The novel features of the invention are set forth in the appended claims. However, for the purpose of explanation, several embodiments of the invention are set forth in the following figures.

FIGS. 12A-12B illustrate a GUI control for setting a duration of an annotation by adjusting a duration bar on a timeline.

DETAILED DESCRIPTION OF THE INVENTION

Figure 1:
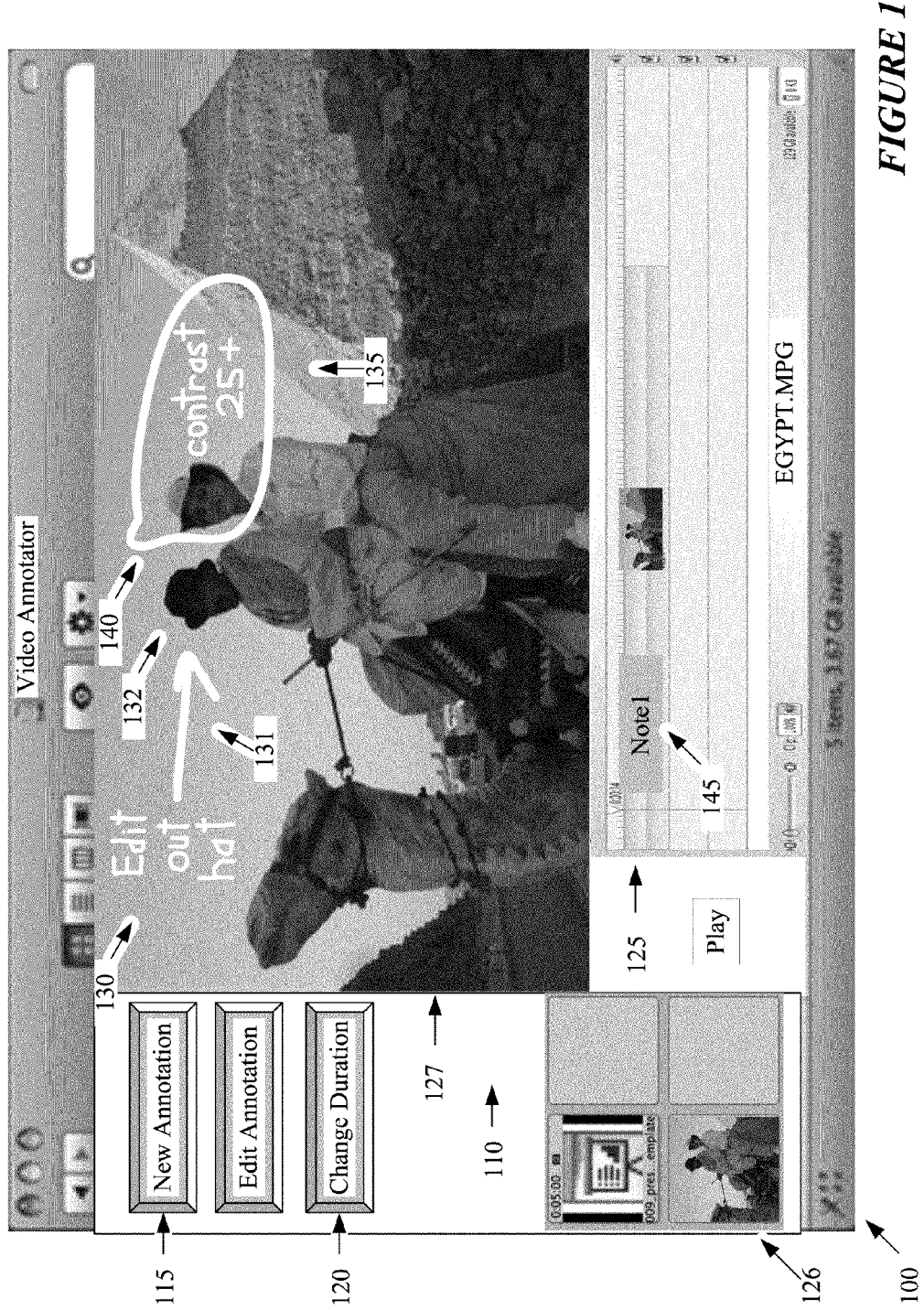
FIG. 1 illustrates a graphical user interface of a video annotating application of some embodiments.

In the following description, numerous details are set forth for purpose of explanation. However, one of ordinary skill in the art will realize that some embodiments may be practiced without the use of these specific details. For instance, the techniques described below are described with relation to video clips. However, some embodiments may be used to annotate slide shows, audio clips, or other types of digital clips.

Some embodiments of the invention are described below as being used by a director, however, nothing requires that a user be a director. Similarly, the annotations are described as being used to give editing instructions. The term "editing" is used here in its broadest sense, to mean any changes to any aspect of a video clip, including coloring, brightness, volume, and any other video or audio changes. Editing instructions could even refer to instructions to change additional content such as closed captions. However, even beyond editing the particular clip, some embodiments can be used for any other type of annotation. For example, a user annotating a video clip could make an annotation to "put this part in the advertisements for the film", "find out who that extra is and put him in the crowd scene we are shooting later for the sequel", "reshoot this scene because the face of an actor is blurry", or even just "good job on this part".

I. Overview

Some embodiments allow a user to annotate digital clips (e.g., video clips, audio clips, or other media clips) and set a duration over which an annotation applies. An annotation is a message from a person making the annotation to one or more people reading, hearing, or seeing the annotation. Annotations of some embodiments can be textual, auditory, graphical, or some combination of such elements. Different annotations for a digital clip may be relevant over different durations of the clip. Accordingly, as mentioned above, some embodiments allow a user to set a duration within a clip (e.g., starting three minutes into the clip and lasting ten seconds) for an annotation for a digital clip. Some embodiments play digital clips that have been annotated. In some such embodiments, if a portion of the digital clip corresponding to the duration of an annotation is played or displayed, then the embodiment also plays or displays the corresponding annotation.

Various embodiments allow users to make various types of annotations including graphical annotations, text annotations, and audio annotations. In some embodiments, a digital clip is played or otherwise presented to a user, and the user can enter annotation of the digital clip while it plays. Some embodiments pause the playing of a digital clip while annotations for the clip are entered.

Some embodiments provide a graphical user interface (GUI) that includes tools or controls that allow a user to enter and edit annotations for a digital clip. For example, the GUI of some embodiments provides controls that allow a user to make an annotation that includes one or more graphical images (e.g. drawings). Some embodiments allow a user to make such a drawing by using a cursor control device (e.g., a graphics tablet). The GUIs of some embodiments provide controls for setting one or more characteristics of lines (e.g., thickness, color, etc.) in a drawing. In some such embodiments, the GUI provides a display area (e.g., an area displaying a frame of a video clip) that the user can draw on using the cursor control device.

Some embodiments can receive text annotations typed on a keyboard or converted from handwritten or audio annotations to text. While converting handwritten annotations, some embodiments use various characteristics of hand-drawn annotations to distinguish between hand-drawn written text and hand-drawn graphical annotations. Once an annotation is converted to text, some embodiments add copies of the text or data about the text to a list of annotations that a user can read and/or search.

As mentioned above, different annotations may be relevant during different durations in the clip. The duration of an annotation is a time in the digital clip over which the annotation applies. To allow users to set the durations over which annotations apply, some embodiments provide controls or tools for setting a duration for an annotation. Some embodiments provide editable bars on timelines to let a user set the duration of the annotation. Setting the duration determines how long an annotation will be displayed when a digital clip is played with annotations.

Some embodiments play an annotated digital clip while displaying one or more annotations (made for the clip) during the times within the clip to which the annotations apply. The GUIs of some embodiments can display annotations with digital clips, and can also display digital clips while hiding the annotation. The GUIs of some such embodiments provide a GUI control for determining whether to show or hide annotations while playing the video clip. In addition to receiving and/or displaying annotations, some embodiments can also save annotations.

Various embodiments provide various ways of saving the received annotations. For example, in some embodiments, the received annotations can be saved as metadata associated with one or more frames of the video clip. The received annotations in some embodiments can also be saved as a file that is separate from the video clip but temporally synched with the video clip. Some embodiments can generate annotated versions of digital clips. The annotated versions of some embodiments allow a user to view (and/or hear) the clip's associated annotations while playing the clip on a video annotating system of some embodiments or on a third party player after saving the annotations.

FIG. 1 illustrates a GUI 100 of a video annotating application of some embodiments that allows a user to add annotations to a video clip. In some embodiments, a video clip is a digital recording of multiple images of visual information. A video clip often contains sequential images that, when displayed rapidly, convey an illusion of motion. As shown in the figure, the GUI 100 provides a display area 110 for displaying video clips, a control 115 for creating or adding a new annotation for a video clip, a control 120 for activating a pop up control (not shown) for receiving commands to set or change the duration of an annotation, a timeline display area 125, and a clip selection area 126.

This figure further illustrates the GUI 100 of some embodiments as the video annotation program is running and a clip is being annotated. The display area 110 displays a frame 127 (e.g., a single image among the multiple images in the video clip) of a video clip depicting two men riding a camel near a pyramid. The video clip in this figure has paused at that particular frame 127 in response to a user (e.g., a director) activating control 115 to add an annotation to the clip.

The annotation that the director has added includes two instructions. The first instruction includes a handwritten note 130 and arrow 131, directing that hat 132 should be edited out. The second instruction includes a handwritten note 135 and a rough circle 140 around the head of the man on the right, directing that the contrast for his head should be increased by twenty-five percent. The annotations in the figure are shown superimposed on the frame 127. However, in some embodiments, the directions in the annotation may apply over some duration, e.g., to multiple frames of the clip. The duration over which the annotation will apply is shown by a bar 145 in the timeline display area 125. The timeline display area 125 of some embodiments is described in more detail in relation to FIG. 12. In other figures (e.g., FIG. 3, the timeline display area of the figure is shown in a simplified form in order to make room for other elements of the figures. However, any of the illustrated embodiments may be implemented with the more complex timelines shown in FIG. 1.

When the annotated video clip is played in some embodiments, the annotation will be displayed along with the annotated video clip, (e.g., superimposed over the images in the clip) starting at the time indicated by the beginning (i.e., the left edge) of bar 145. The annotation will remain displayed for the duration indicated by bar 145, and the annotation will stop being displayed at the time indicated by the end (i.e., the right edge) of bar 145.

In some embodiments, in addition to being an indicator of the duration of the annotation, bar 145 is also a control for changing the duration of the annotation and/or opening the annotation for editing. For example, in some embodiments, double-clicking on bar 145 may open the annotation for editing.

The GUI of some embodiments includes a clip selection area 126 for selecting clips for annotation. Once a clip is selected (either from the clip selection area or by some other control), the GUI allows the selected clip to be annotated.

In some embodiments, the video annotating application annotates video clips that have audio as well as video. For example, an MPEG encoded audio/video clip of a movie may include a sound track for the movie. In such embodiments, the annotations can refer to the sound portion of the video clip as well as to the video portion, or instead of the video portion. For example, a director may annotate the clip to indicate that there is a "pop" in the sound track or that there was the noise of a car passing in the background.

Similarly, some embodiments annotate clips that have audio but have no video. Any of the described features that apply to video annotating applications can be found in some embodiments of audio annotating applications. For example, an audio annotating application may allow graphic notes to be made either on a blank video display or on a display showing a visual representation of the sound of the audio clip.

Figure 2:
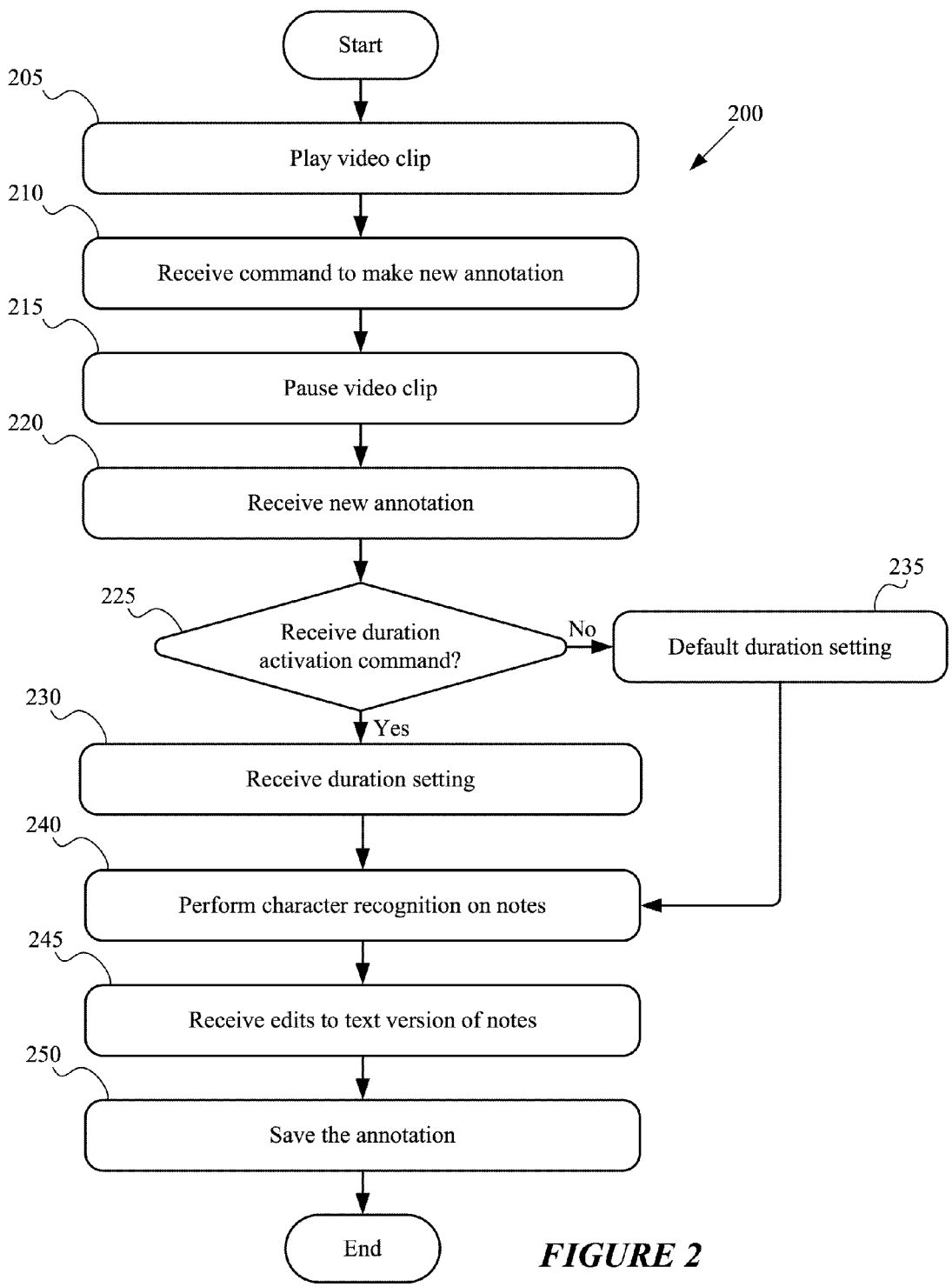
FIG. 2 illustrates the process of receiving an annotation in the video annotating application of some embodiments.

FIG. 2 illustrates a process 200 for receiving an annotation in the video annotating application of some embodiments. The process 200 plays a video clip (at 205) in the display area. "Playing the video clip" could mean playing the clip at normal speed, at some other speed, or even displaying individual frames selected by the user. While the clip is playing, the process 200 receives (at 210) a command to make a new annotation (e.g. it receives a click from a cursor control device or a typed command from a keyboard).

When the command is received, the clip pauses (at 215). With the clip paused, there is time for a user to annotate the clip without the clip progressing past the point where the annotation is needed. The annotating application receives the annotations (at 220). Once the annotations are complete, if (at 225) the director activates a duration setting command, then the application receives (at 230) a setting for the duration of the annotation. Various methods are used by various embodiments to set the duration, as further described in section III, below. If no duration is set by the director, then the annotating application of some embodiments sets the duration to a default duration (at 235). In some embodiments, the default duration is one frame, specifically, the frame on which the annotation was entered. In other embodiments, the default duration is some fixed length of time, such as one second. In some embodiments, the default duration can be set by a director (e.g., with a menu control).

The process 200 illustrated in FIG. 2 includes operations 240 and 245 that are performed in some embodiments, but are not performed in other embodiments. The application of some embodiments performs character recognition (sometimes called handwriting recognition) (at 240) on any handwritten notes in the annotation to convert them from unsearchable graphics into searchable text. In some embodiments, the director can edit the converted text (at 245). Once the director is finished annotating one or more frames then the process 200 saves the annotation (at 250) and ends.

II. Annotations

Figure 3:
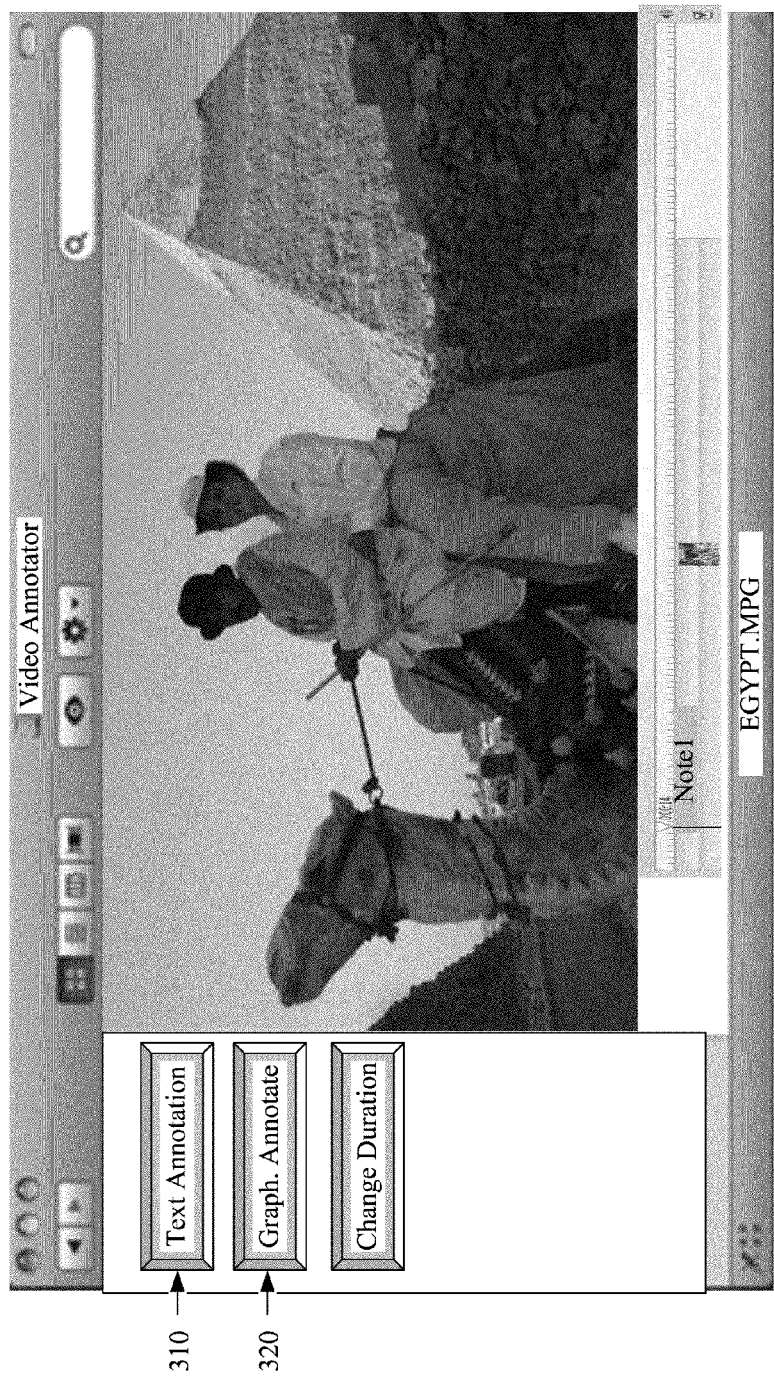
FIG. 3 illustrates graphical user interface controls of some embodiments for commanding the application to receive various types of annotations.
Figure 3:
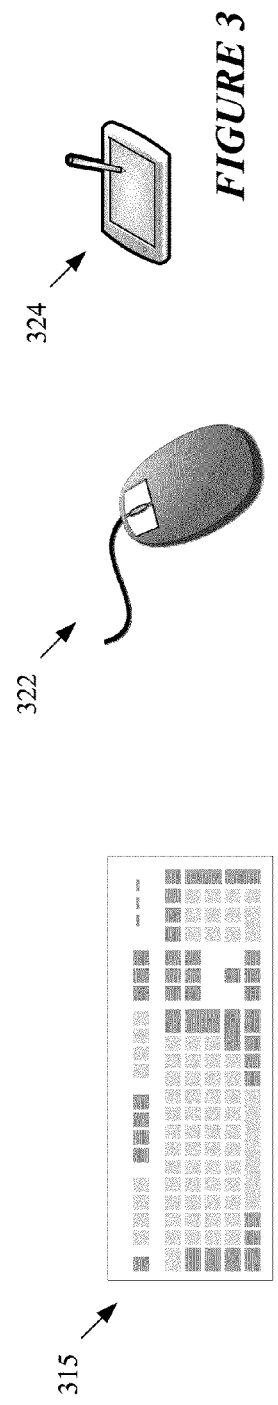

The video annotating applications of various embodiments allow multiple types of annotations. Some embodiments provide tools or controls in the GUI (e.g., buttons, sliders, or selectable display areas) for commanding the GUI to receive or edit an annotation. FIG. 3 illustrates GUI controls of some embodiments for commanding the application to receive various types of annotations. Button 310 is for commanding the application to receive a text annotation, e.g., searchable text from keyboard 315 or from a paste operation. Button 320 is for commanding the application to receive a graphical annotation, e.g., from a mouse 322 or graphics tablet 324. These types of annotations are further described in the subsections below. One of ordinary skill in the art will realize that the buttons shown in this figure are merely examples of controls for commanding the application to receive various types of annotations.

In some embodiments, a video annotating application may be designed to pause a clip and/or start an annotation when a user clicks on a displayed clip with mouse 322, starts typing on a keyboard 315, or starts drawing on a tablet 324 or touch screen (not pictured). That is, the application of some embodiments does not need a user to activate a separate GUI tool or control (e.g., a button displayed in the GUI) to start a new annotation. In some such embodiments, a user can simply begin to annotate (e.g., begin typing or using a cursor controller to draw in the display area) and the application will receive the new annotation for the displayed frame of the clip. Various types of annotations and ways of directing the application to receive them are further described in the subsections below. In some embodiments, activating any type of annotation pauses the clip. Annotations are displayed when playing a clip, but some embodiments provide controls (e.g., one or more buttons) for hiding and revealing the annotations while a clip is playing.

In some embodiments, a user can cut or copy an annotation and paste it at a different time in the clip, or in a different clip. The user can then edit the original annotation and the pasted annotation separately.

A. Graphical Annotations

Some embodiments accept graphical annotations for video clips (e.g., through GUI tools). Embodiments that provide tools for making graphical annotations allow a director to draw pictures and/or symbols on the video clip to indicate common editing actions. For example, a director might establish that a rectangle drawn around part of an image in a clip indicates that the clip should be edited to show only the part of the image that is in the rectangle. In some embodiments, the cursor and the display area are part of a set of controls (e.g., paint brush, line drawing tool, paint fill tool, etc.), or annotation tools, for making graphical annotations.

Figure 4:
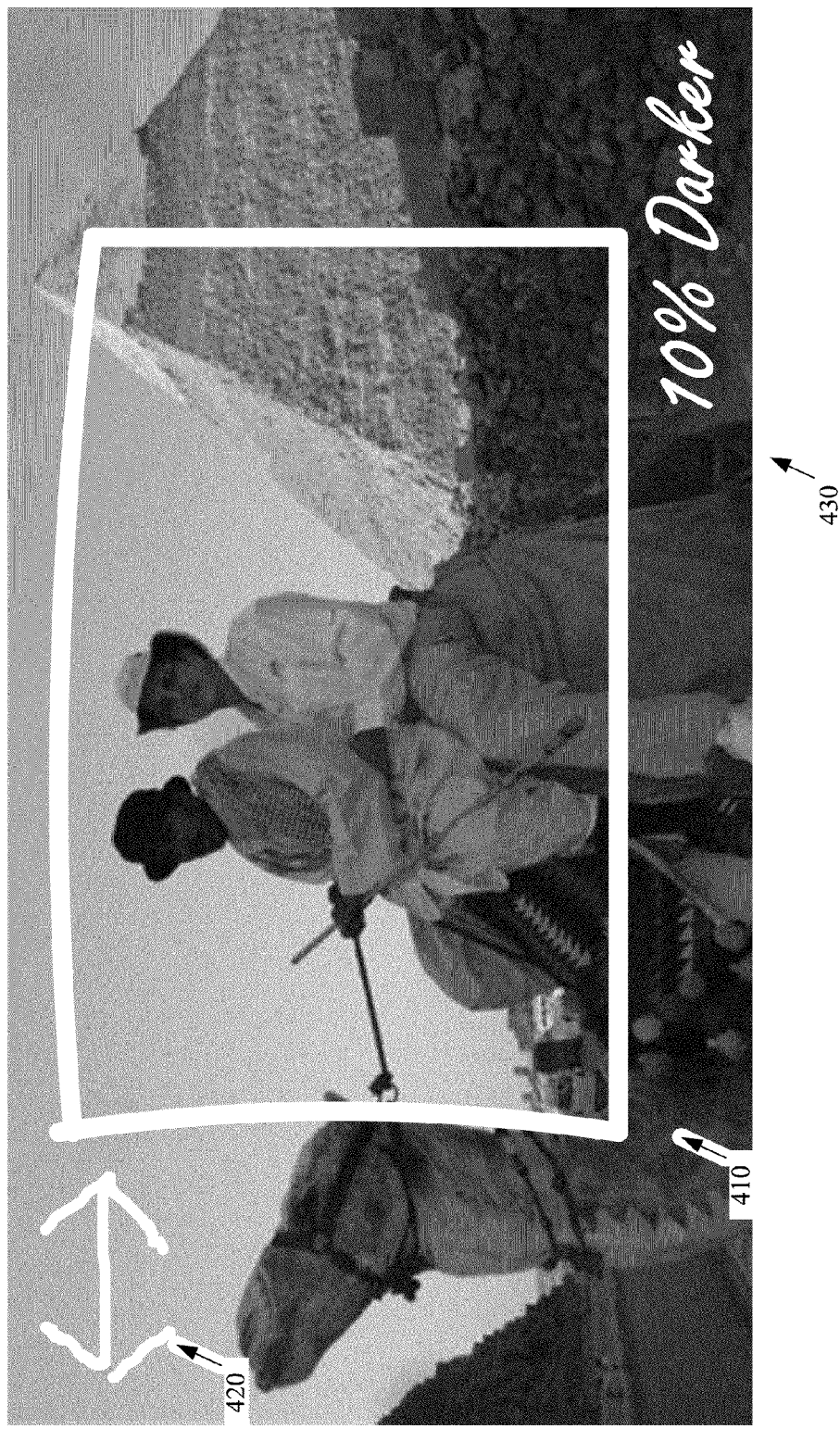
FIG. 4 illustrates some examples of graphical annotations.

FIG. 4 illustrates some examples of graphical annotations. The figure shows clip 400, annotated with rectangle 410, double headed arrow symbol 420, and handwritten note 430. Rectangle 410 could be added by a director to indicate that the clip should be edited to show only the portion of the clip 400 that is in the rectangle. A director might add the double headed arrow symbol 420 to indicate that the clip should be edited so that the scene is mirror reversed.

The application may also allow a director to write a handwritten note such as handwritten note 430 as a graphical annotation. For example, a note such as handwritten note 430 could indicate that a scene should be 10% darker. When a handwritten note is made in a graphical annotation, some embodiments perform special operations on the handwriting to convert it to searchable text. These operations are further described in relation to text annotations in subsection II.B., below.

In some embodiments, a graphical annotation can be moved within a frame, resized, or edited after it has been entered. In some embodiments, this moving, resizing, or editing is done by selecting a tool (not pictured) with a cursor control device to open a selection box, selecting the annotation with the selection box, and then performing the desired operation on the annotation (e.g., moving the box moves the annotation, dragging the corners of the selection box resizes the annotation, etc.). In other embodiments, one button of a cursor control device can be used for entering new annotations, while another button of the cursor control device can be used for moving, editing, or resizing existing annotations. Examples of such cursor control devices are provided below with reference to FIG. 5.

Figure 5:
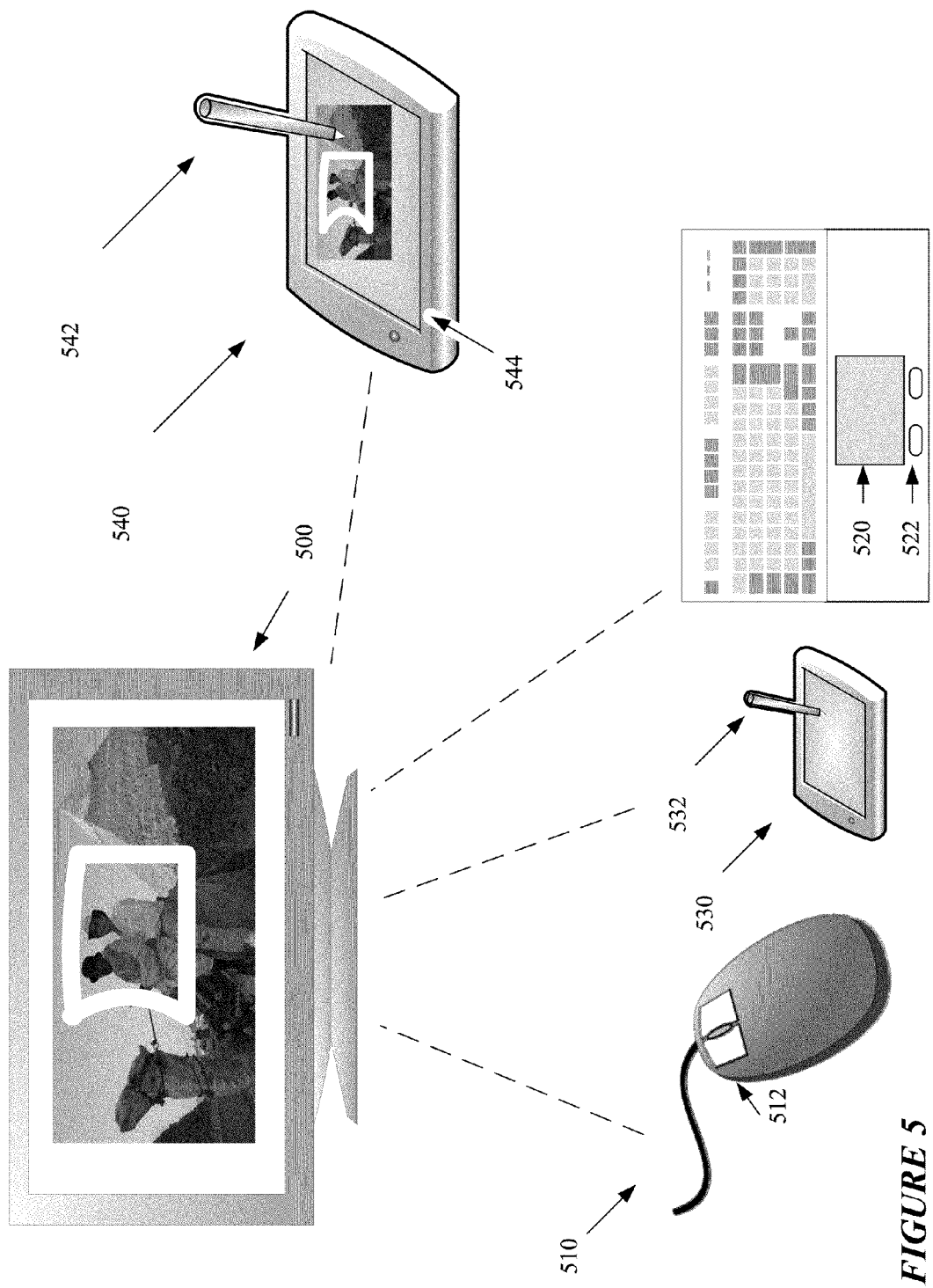
FIG. 5 illustrates various devices for making graphical annotations.

Different devices can be used to create graphical annotations. FIG. 5 illustrates various devices for making graphical annotations that appear on display 500, including a mouse 510 with a mouse button 512, a touchpad 520 with a touchpad button 522, and a graphics tablet 530 with a stylus 532. The figure also illustrates a touch screen 540 that includes a stylus 542 and a display 544.

The mouse 510 can be used to move a cursor around within the GUI. A user moves the cursor by moving the mouse 510 around on a surface. By clicking on a clip with mouse button 512, a user can initiate a graphical annotation. The user can then click and hold the mouse button 512 and drag the mouse 510 to draw on the screen. Various controls (not shown) of the GUI can be selected to set the color, thickness, or pattern of the line drawn by the mouse. Touchpad 520 can also be used to move a cursor around within the GUI. A user moves the cursor by stroking the touchpad 520. As with the mouse, in some embodiments, a graphical annotation can be initiated by clicking on button 522 of the touchpad. In some embodiments, tapping on touchpad 520 also initiates a graphical annotation.

The graphics tablet 530 allows a user to draw with a drawing tool, such as stylus 532. A stylus is more precise than a mouse and better suited for drawing. The applications of some embodiments generate a graphical response (e.g., displaying a line) on display 520 at a location corresponding to wherever the stylus touches the graphics tablet 530. Dragging a stylus along the graphics tablet 530 produces a line on the display corresponding to the location of the dragging on the graphics tablet 530. If the area of the display used by the GUI is larger than the area of the graphics tablet 540, then the line on the display will be proportionately larger than the line on the graphics tablet 540. For example, dragging a stylus halfway across an eight inch wide graphical tablet 540 will produce a line half-way across a twenty inch wide display.

Touch screen 540 is well suited to this type of graphical annotation. Touch screen 540 allows a user to use a finger or stylus 542 to draw directly on an image in touch screen display 544. Thus, a touch screen provides visual feedback at the site of the moving stylus (or finger). Furthermore, touch screen display 544 is the same size as its writing area, so dragging the stylus an inch across the touch screen results in an inch long line on the display screen 544, avoiding potential confusion due to size mismatch between the display and the writing area. In some embodiments, the touch screen 540 can be used both as a display of its own and as an input device for controlling a cursor of a separate display 500. In such embodiments, the touch screen 540 provides visual feedback as the same scale as the drawing surface while the display 500 provides a separate (in some cases larger) view of the GUI.

B. Text Annotations

Some embodiments accept text annotations for video clips. Text annotations are annotations that are saved in memory as text, rather than as a graphical image. That is, the computer keeps track of the individual characters (e.g., letters, numbers, punctuation and other symbols), and displays the text based on the stored character information (along with font information from the application or operating system) rather than displaying a stored image of what the message as a whole looks like.

Text annotations, unlike graphical annotations, or even graphical representations of handwritten notes, can be searched for keywords and phrases. Accordingly, if a large clip, or a large number of smaller clips, is annotated, text annotations make it possible to very rapidly find a particular word or phrase used in the annotations. For example, an editor whose job is to change the contrast of clips, as instructed by the director in the annotations, could search for the word "contrast" among the annotations by the director.

Figure 6:
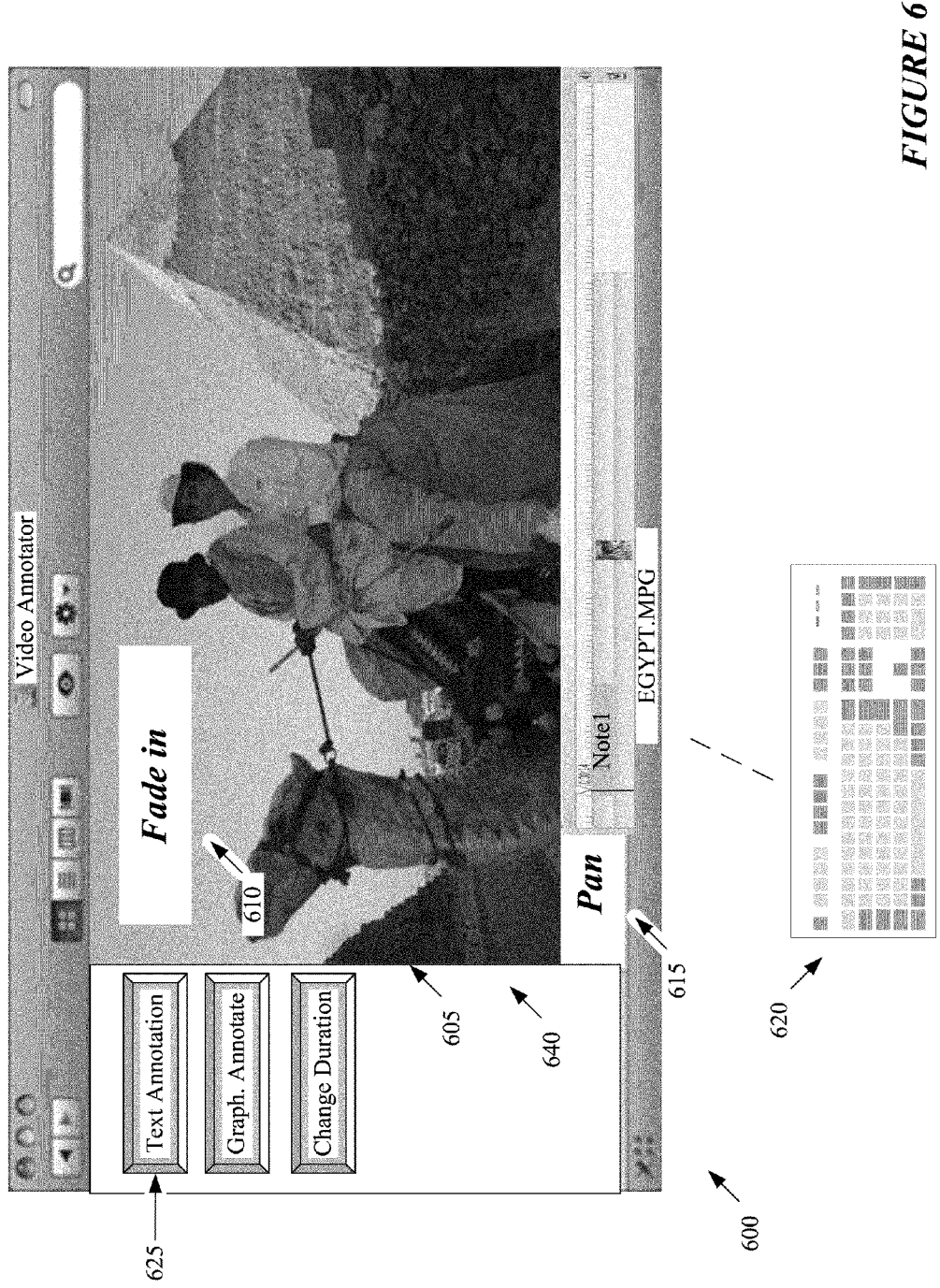
FIG. 6 illustrates a graphical user interface with tools for adding text annotations.
Figure 7:
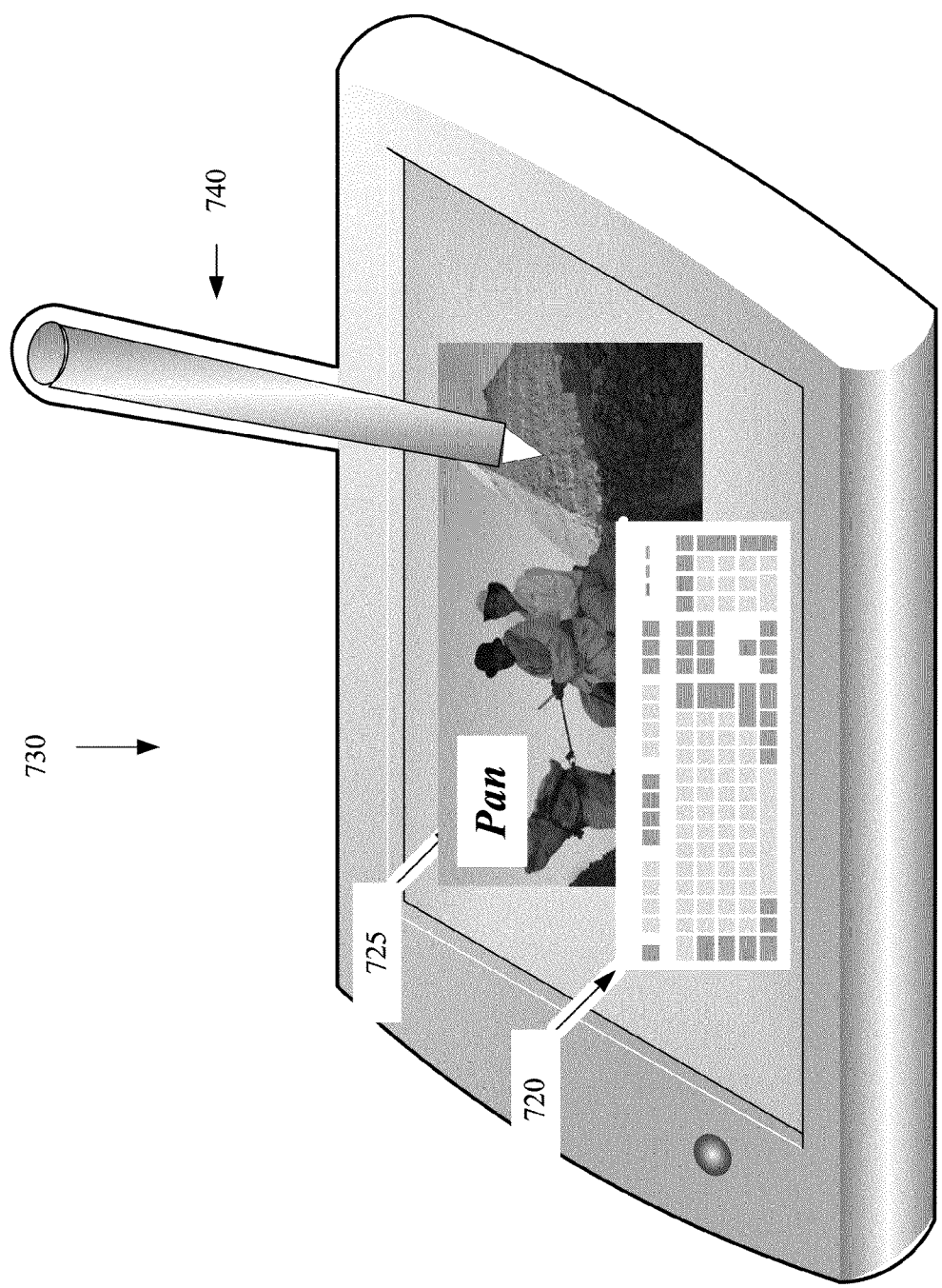
FIG. 7 illustrates a virtual keyboard for entering a text annotation on a touch screen.

Text annotations can be entered and displayed in many different ways. Some examples of entering text annotations are illustrated in FIGS. 6-8. FIG. 6 illustrates a GUI 600 that provides a tool (i.e., a "Text Annotation" button 625) for adding text annotations to a video clip 605. Text annotations 610 and 615 have been typed on a computer keyboard 620.

Some embodiments provide text boxes to be displayed in front of the video clip to which they relate, such as text annotation 610, which appears in a text box within the display area 640. In some embodiments, text boxes such as the one containing annotation 610 can be moved within the GUI 600 with a cursor control device (e.g., a mouse, touchpad, etc.) or by commands from keyboard 620.

Some embodiments provide text boxes to be displayed outside of the video clip to which they relate. Text annotation 615 appears in a separate text box that does not appear over the video clip 605 in the display area 640. Some embodiments allow text annotations both outside and inside the display area. Some embodiments allow text boxes to be dragged from in front of a video clip to outside of the video clip and vice versa. Some embodiments provide a virtual keyboard for entering text annotations (e.g., for use with a touch screen application). FIG. 7 illustrates a virtual keyboard 720 for entering a text annotation 725, one letter at a time, on a touch screen 730. A user taps the individual keys of the virtual keyboard 720 (e.g. with a stylus 740) in order to add the character corresponding to the tapped key to a text annotation 725.

Some embodiments allow a user to enter handwritten notes and convert the notes to text using handwriting recognition software. In some embodiments, the application includes its own handwriting recognition software. In other embodiments, the application uses third-party handwriting recognition software, such as handwriting recognition software built in to an operating system (e.g. Apple's® InkWell).

Figure 8A:
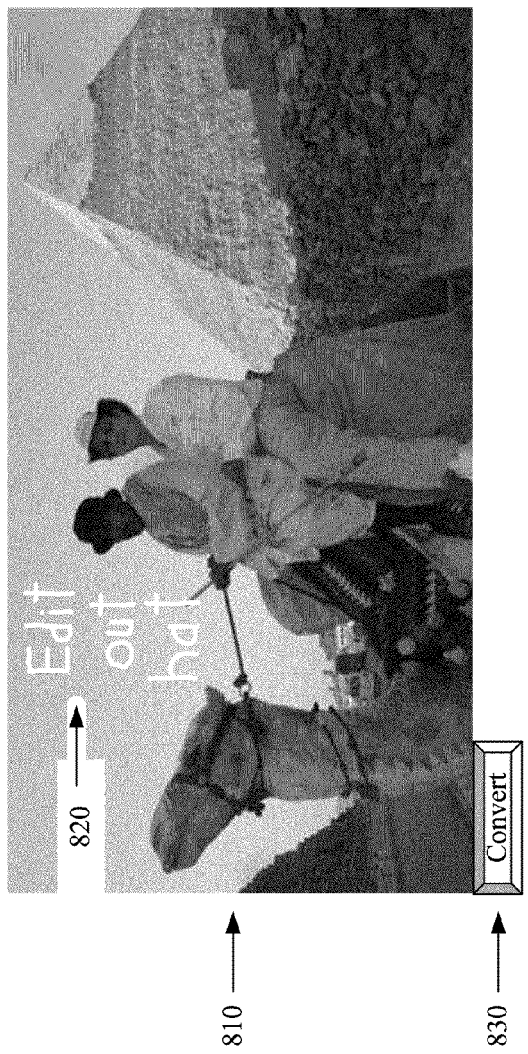
FIGS. 8A-8B illustrate a conversion of handwritten notes to text notes via character recognition software.
Figure 8B:
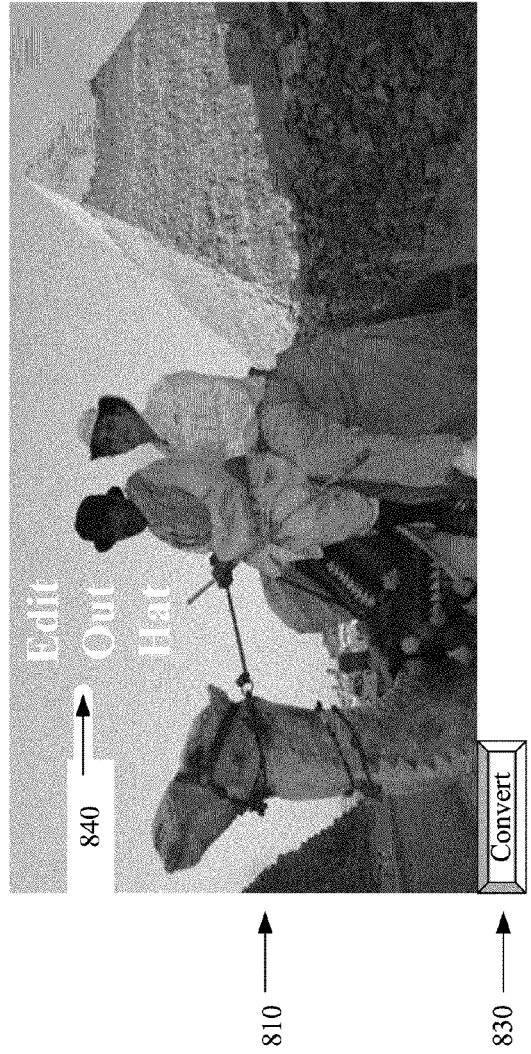

FIGS. 8A-8B illustrate a conversion of handwritten notes to text notes via handwriting recognition software. FIG. 8A shows a display area 810 (before conversion), handwritten note 820, and conversion button 830. FIG. 8B shows display area 810 (after conversion), text note 840, and conversion button 830. The video annotating application in these figures receives handwritten notes 820 in the display area 810 from the same types of cursor control devices used for the hand-drawn graphical annotations described above. In some embodiments, the application automatically converts the handwritten note 820 to text note 840. In other embodiments, the application converts the note only after receiving a command from the user to do so, e.g., a click on conversion button 830. In some embodiments, the application converts the handwritten note 820 to text for the purposes of indexing, but keeps a graphical representation of the handwritten note 820 to display on the clip. In some embodiments, the handwritten note is converted to text for purposes of legibility.

In some embodiments, the handwriting recognition software is able to distinguish between a user's handwritten text and a user's handwritten drawings. For example, a user may draw a circle around an object. The handwriting recognition software will determine that the circle is an image of a circle, rather than the letter "O" or the number zero. Some embodiments make this determination automatically based on the relative size of drawings versus text. Some embodiments allow a user to revert a handwritten annotation that was converted to text back to the original handwritten annotation (e.g., by right-clicking a mouse to open a context menu and selecting a menu option for reverting the converted text back to the handwritten text).

Some embodiments allow a user to manually select one or more handwritten notations for text recognition. For instance, in some embodiments, a cursor control device (e.g., a mouse, touchpad, stylus, touch screen, etc.) can be used to draw a selection box around the handwritten note that is to be designated for text recognition. In other embodiments, a control (e.g., a button) may be selected that activates a text recognition mode. A user may then use a cursor control device to enter a handwritten note. The user may then select a control (e.g., the same button used to activate text recognition mode, or a different button) to deactivate text recognition mode.

Upon the deactivation of text recognition mode, the handwritten annotation is automatically converted to a text annotation in some embodiments.

Some embodiments use learning algorithms to improve the identification of handwritten words in a particular user's handwriting. Some embodiments have lists of preferred words that influence the identification of the handwritten words. For example, if character recognition determines from handwriting alone that a word is equally likely to be "filter" or "fitter," then a video annotating application of some embodiments could determine that it is actually "filter" because "filter" is a more commonly used term in video editing than "fitter."

Once handwritten note 830 has been converted into text note 840, the application of some embodiments provides editing tools to edit the text of text note 840. These editing tools allow a user to fix any errors in character recognition, to add any additional text desired, and/or to delete any text desired.

Figure 9:
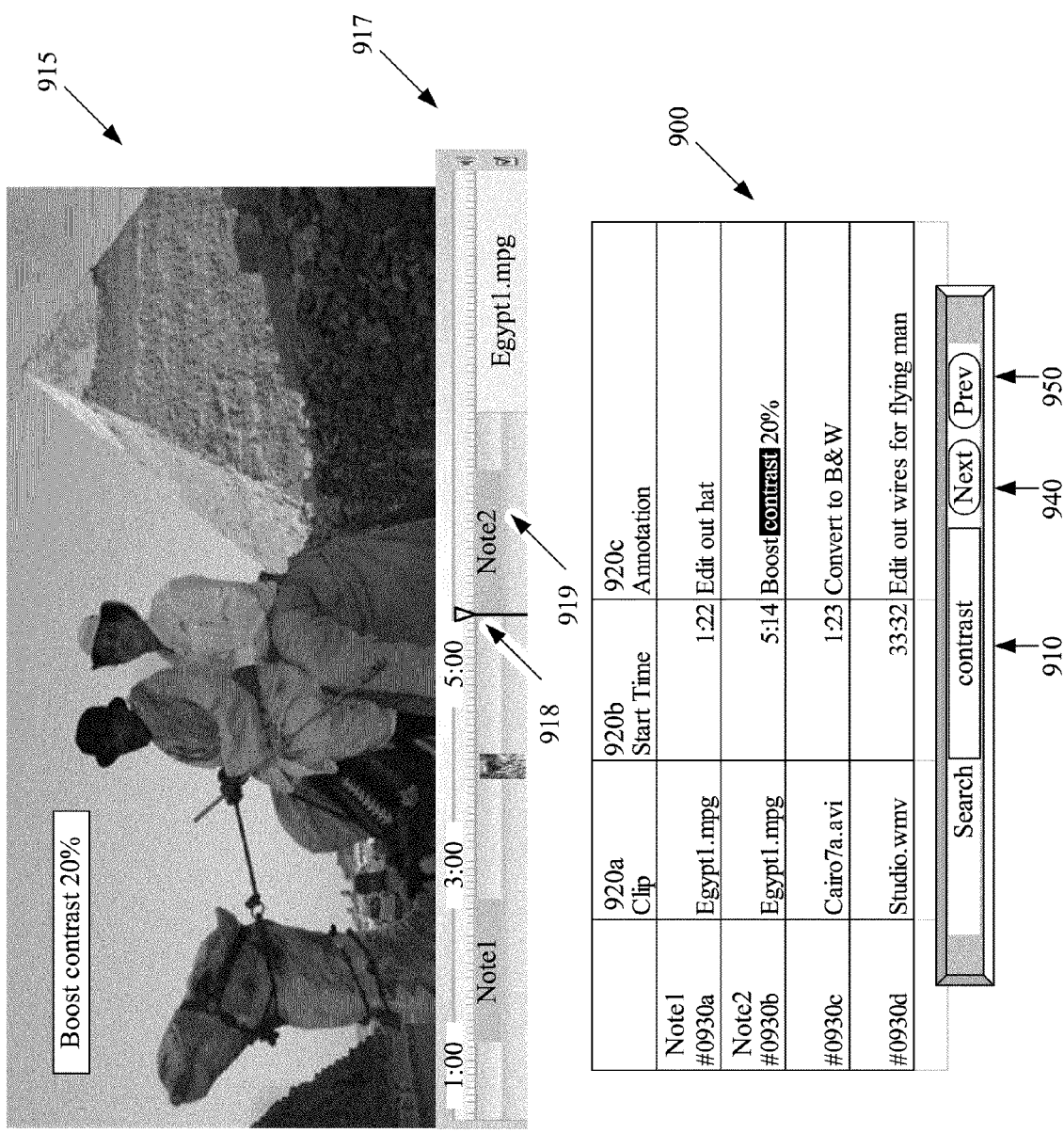
FIG. 9 illustrates a searchable list of text annotations.

One advantage of text is that it is searchable. That is, saved text can be searched by a computer program to find a particular word or phrase within that saved text. Some embodiments provide a searchable list of text annotations for a clip, or a series of clips. FIG. 9 illustrates a searchable list 900 of text annotations. The figure also shows search window 910, display area 915, and timeline 917. In some embodiments, when a text annotation is found, the display area 915 displays the first frame to which the text annotation applies and the timeline 917 shows, with pointer 918, that the video is showing the frame at the beginning of note 2 (919).

The searchable list 900 has columns 920a-920c and rows 930a-930d of data. Each of the rows 930a-930d contains data relating to a particular text annotation. Column 920a contains listings of the clips to which each text annotation relates. Column 920b contains listings of the times (within the clip) of each text annotation. Column 920c contains listings of the text of each text annotation. One of ordinary skill will understand that this is just an example of a searchable list and that some embodiments provide searchable lists with more or fewer columns and/or rows than searchable list 900, as well as different formats.

In some embodiments, the search window 910 is for typing in words, phrases, and/or Boolean expressions. The application searches within the text annotations for the word, phrase, or expression from the search window. The GUI provides a "next" button 940 and a "previous" button 950 to receive a command from the user (e.g., a mouse click) to find the next or previous instances of the term or terms in the search window 910.

C. Audio Annotations

Some embodiments accept audio annotations for digital clips. Audio annotations are annotations that include spoken words or any other sound. Such annotations can be entered by a user speaking, singing, or otherwise producing sounds for a microphone, or by a user copying an audio clip to the annotation.

Figure 18:
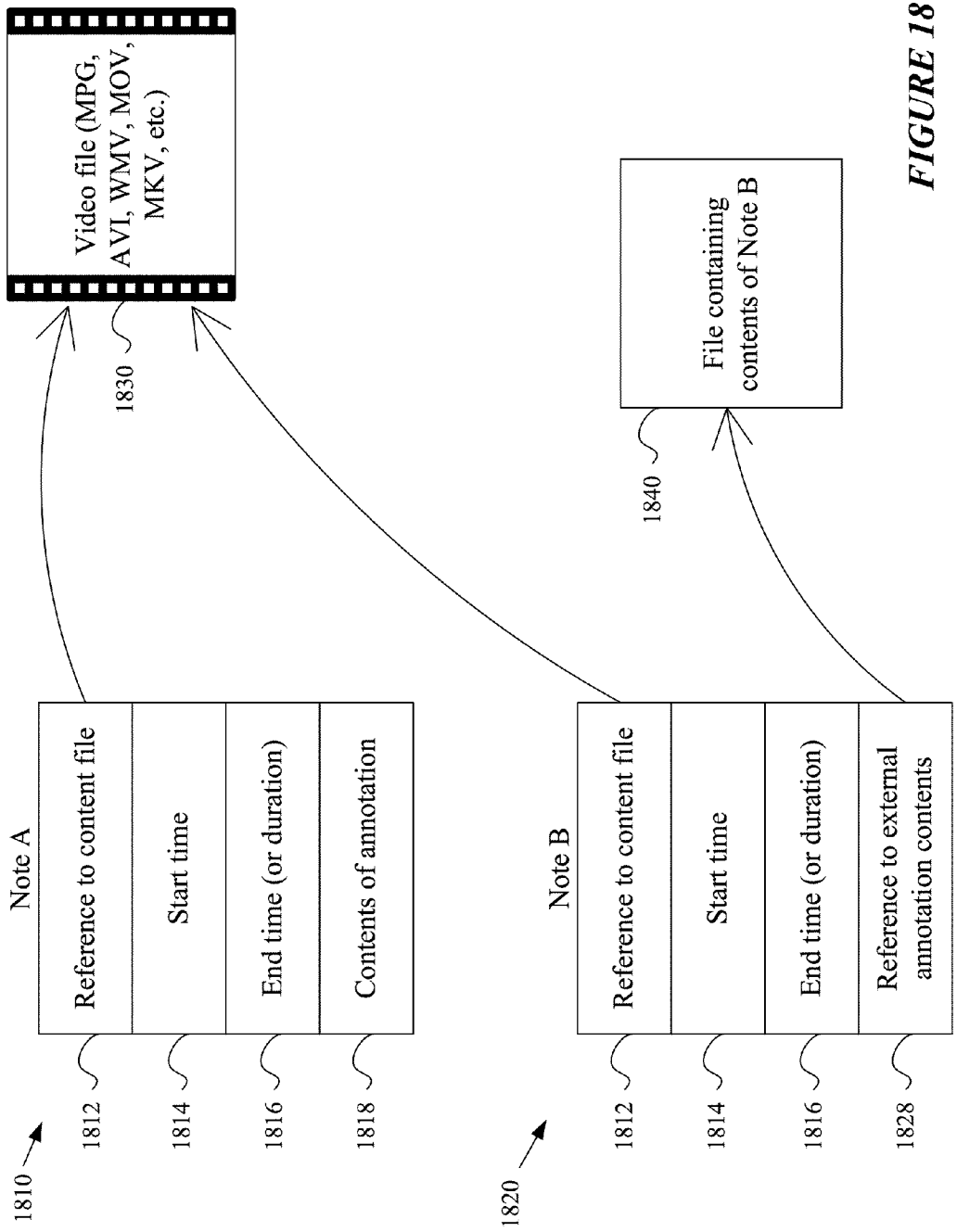
FIG. 18 illustrates two data structures used by some embodiments to store annotations for a video file.

Some embodiments save the audio clip as part of the note data structure (e.g., when the note is stored as a separate file from the video, as described in relation to FIG. 18 in section IV., below. That is, the note has a reference to an audio file that contains the audio associated with the note). Some embodiments convert the audio annotations into text using a speech recognition module. In some embodiments, both the audio clip and the recognized text are saved. In some embodiments, the text generated by the speech recognition module is searchable. The annotation applications of some embodiments provide speech recognition modules. In other embodiments speech recognition is provided by a separate application (e.g., a speech recognition application built into the operating system of the computer on which the application is running). In some embodiments, the speech is recognized and converted to text as the user speaks, while in other embodiments, the speech is recognized and converted to text at a later time (e.g., when the user stops speaking).

Once the speech has been converted to text, some embodiments allow that text to be edited, just as text entered directly can be edited. Some embodiments keep both the converted text and the original sound recording. Keeping both versions allows the text to be searched without losing any nuances in the audio recording.

D. Software Architecture for Annotations

Figure 10:
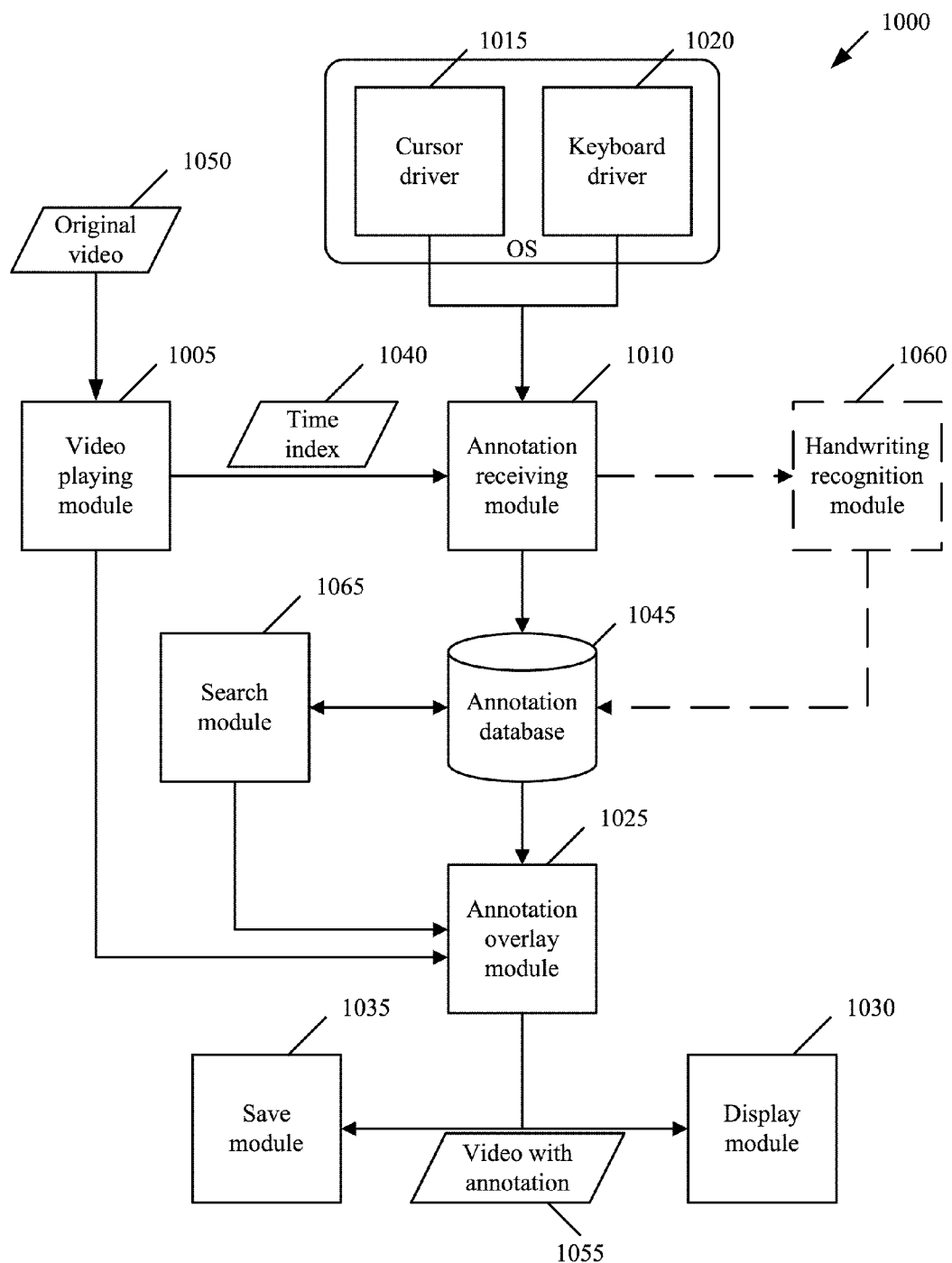
FIG. 10 conceptually illustrates the software architecture of a video annotating application of some embodiments.

Different embodiments provide video annotating software with various different modules for entering annotations, setting the duration of annotations, and saving the annotations. FIG. 10 conceptually illustrates the software architecture 1000 of a video annotating application of some embodiments. FIG. 10 illustrates a video playing module 1005, annotation receiving module 1010, a cursor driver 1015, a keyboard driver 1020, an annotation overlay module 1025, a display module 1030, a save module 1035, a handwriting recognition module 1060, and a search module 1065. These modules produce and use various types of data, such as time index 1040, annotation database 1045, original video 1050, and video with annotation 1055.

The video playing module 1005 plays a video clip from original video 1050 and provides data on the current time index 1040 (e.g., what frame number the video is showing) of the video clip to annotation receiving module 1010. The annotation receiving module 1010 uses the time index 1040 to set the starting time for any annotations received from input device drivers controlled by an operating system of a computer system that runs the application (e.g., cursor driver 1015 and/or keyboard driver 1020).

In other words, the software architecture 1000 associates the received annotation with a particular part of the video clip by saving the time index 1040 of the original video 1050 along with the annotation received by the annotation receiving module 1010 or retrieved by the search module 1065. This allows the annotation to be displayed along with the associated part of the video clip when the video clip is played with the annotations.

The annotation overlay module 1025 retrieves annotation data from the annotation database 1045 and/or the search module 1065 and combines it with original video from the video playing module 1005 to produce video with annotation 1055. The video with annotation 1055 can be sent to display module 1030 for displaying in a display area of a GUI (not shown). Video with annotation can also be sent to save module 1035 for saving in various formats, further described in section IV.

Some embodiments include an optional handwriting recognition module 1060, which converts some or all of the graphical annotations received by the annotation receiving module 1010 into text annotations. Annotations received by annotation receiving module 1010, including those converted by the handwriting recognition module 1060 of some embodiments, are saved as individual files (e.g., one file contains a data structure containing information about one or more annotations), as metadata within a video file, or as text extracted from these individual files or metadata.

In some embodiments, this extracted text is saved in annotation database 1045. In some embodiments, the annotation database 1045 is simply a file (e.g., an XML file, a plain text file, a comma-separated value file, etc.), or group of files, on a computer system that executes the annotating application. In other embodiments, the annotation database 1045 is a more complex database (e.g., an SQL database). Examples of data structures that may be stored in the annotation database 1045 and/or the individual files of some embodiments are described further below in Section IV. The search module 1065 is able to access the annotation database 1045 and perform the search functions discussed above with reference to FIG. 9.

As mentioned in Section II.C., some embodiments include an optional voice capture module (not pictured), which receives audio from an audio input driver of the operating system, which interfaces with an audio input device (e.g., a microphone). In some embodiments, the voice capture module includes, or interfaces with, a voice recognition module (not pictured). The voice recognition module recognizes spoken words and converts these words into recognized text annotations.

The voice capture module provides audio and/or recognized text annotations to the annotation receiving module 1010 in some embodiments, while the voice capture module provides audio and/or recognized text annotations directly to the annotation database 1045 in other embodiments. In other embodiments still, the voice capture module provides audio and/or recognized text annotations to both the annotation database 1045 and the annotation receiving module 1010.

One of ordinary skill in the art will realize that FIG. 10 illustrates some embodiments, and that other software architectures are used in other embodiments. For example, in some embodiments, both the original video and the annotation overlay are sent separately to a display module. In some embodiments, the described software modules are separate from the operating system of the computer system, while in other embodiments, some or all of the described software modules are implemented as a part of the operating system. Some embodiments provide individual modules that include some or all of the functions of more than one of the modules of FIG. 10. Some embodiments provide multiple modules to perform various functions that are performed by single modules of FIG. 10.

III. Durational Controls

An annotation for a digital clip is often relevant for more than a single frame. Different annotations are relevant for different durations (e.g., because different camera shots have different durations). Accordingly, some embodiments provide controls for setting a duration within the digital clip for which the annotation is relevant.

Figure 11:
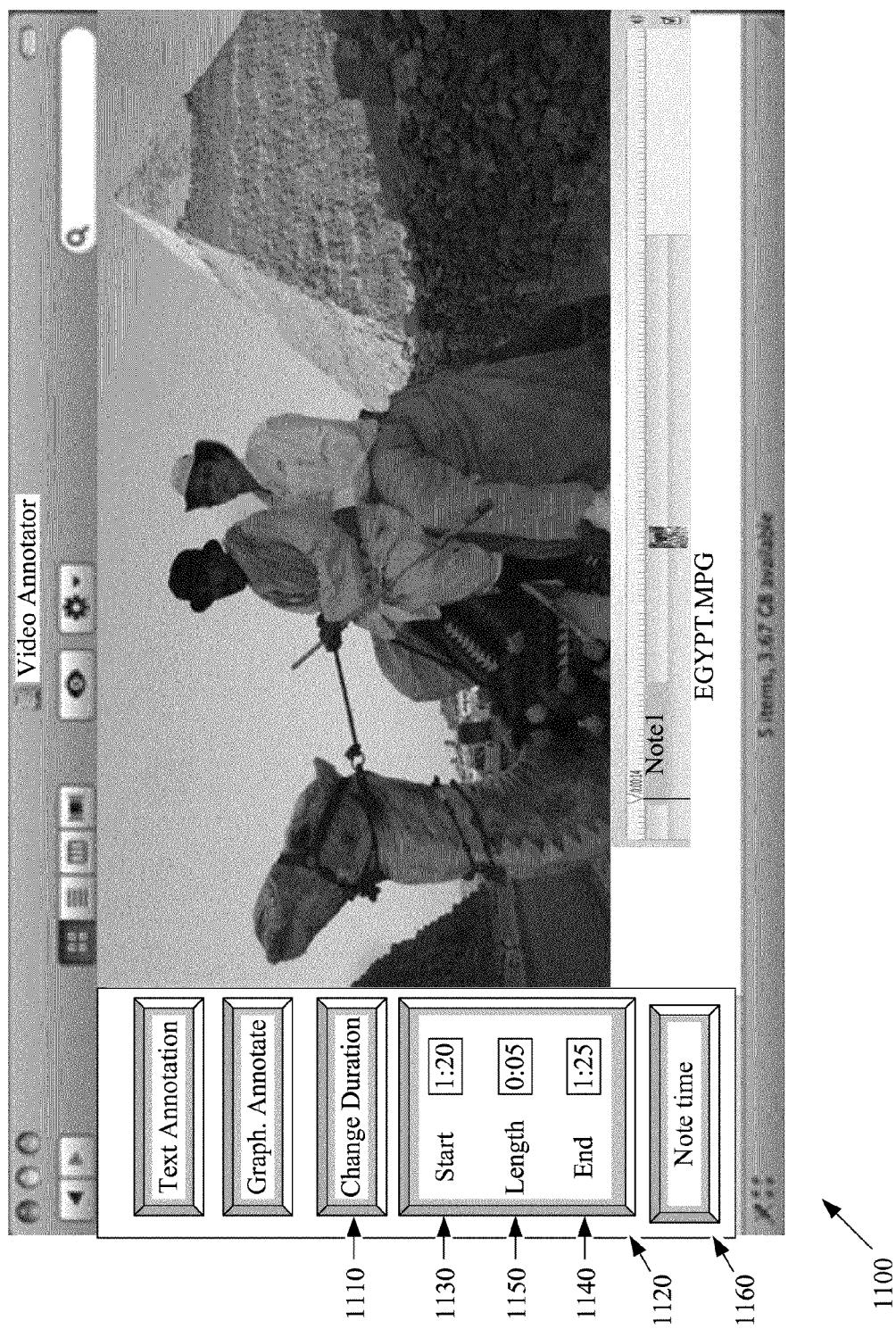
FIG. 11 illustrates a pop up control for typing in start and end times for an annotation.
Figure 13:
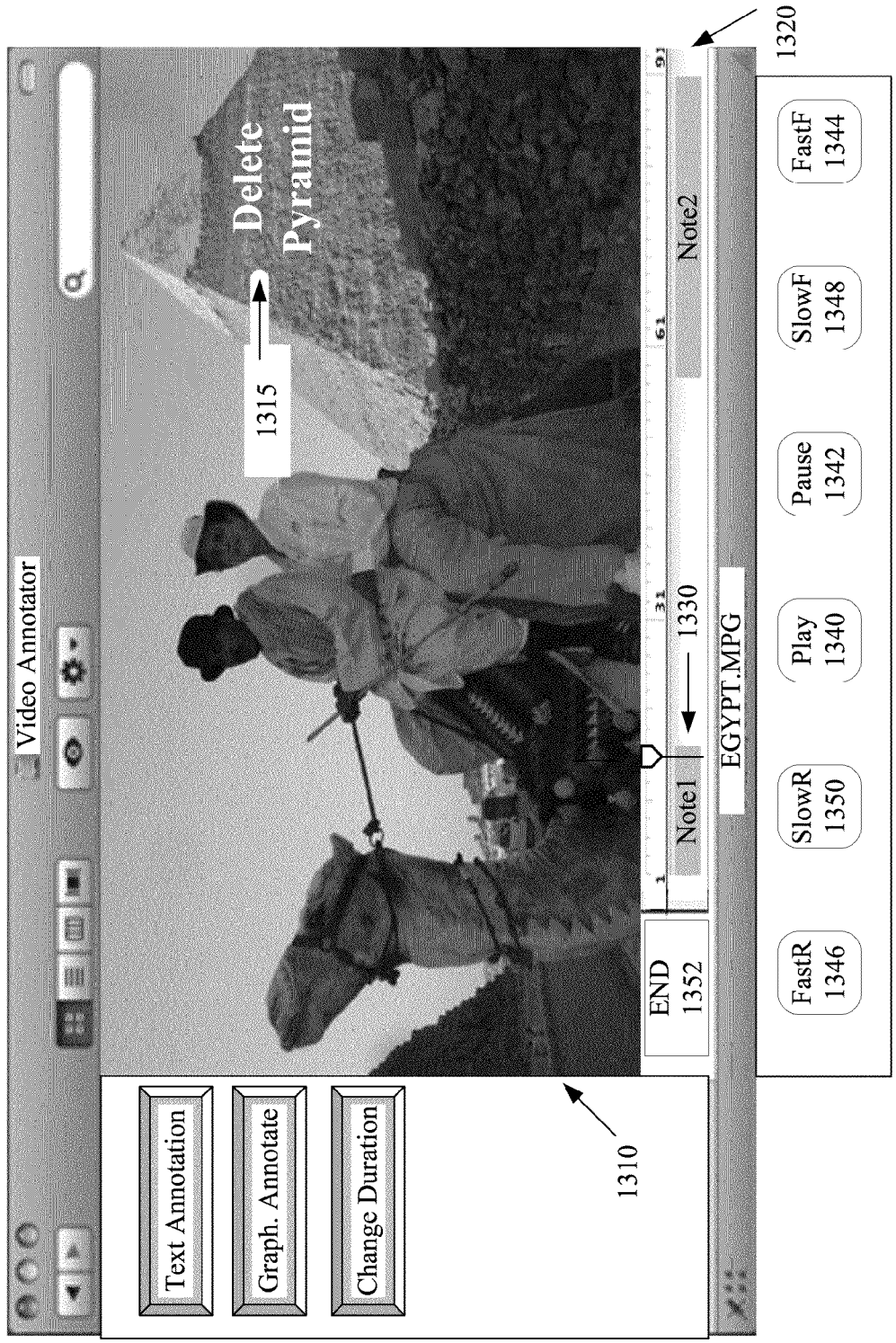
FIG. 13 illustrates GUI controls for setting an end time for of an annotation in some embodiments.

FIGS. 11-13 illustrate three different examples of GUI tools of some embodiments for setting the duration for an annotation. FIG. 11 illustrates a pop up control 1120 for typing in start and end times for an annotation. The figure shows a GUI 1100, with a button 1110 for activating a pop up control 1120 for entering a duration for a selected annotation. When the GUI receives a click on button 1110, the pop up control 1120 appears. The pop up control 1120 contains annotation start time setting 1130, annotation end time setting 1140, and annotation duration setting 1150. The GUI 1100 of the embodiment of this figure automatically provides a value for the annotation start time 1130. Specifically, it enters the time of the frame for which the annotation was originally made.

The GUI allows the user to enter either a duration for the annotation in the annotation duration setting 1150 or an end time for the annotation in the annotation end time setting 1140. Some embodiments automatically set one value when the other value is set by a user. For example, if (as shown) the start time in the annotation start time setting 1130 is one minute and twenty seconds, and the user sets a duration of five seconds, then the annotation end time setting 1140 is automatically set at one minute and twenty-five seconds (i.e., the start time plus the five second duration). One of ordinary skill in the art will realize that the illustrated pop up control 1120 is only one example and that other pop up tools can be used within the scope of the current invention.

Under some circumstances, a user may want an annotation to remain visible (while the annotated clip is being played) for longer than the duration of the annotation. For example, if a lengthy set of instructions applies for a duration of a fraction of a second in the video clip, then the annotation would not be readable when the clip is played back at full speed. Accordingly, some embodiments provide a note time control 1160 that allows a user to specify a length of time to display an annotation on playback.

In other words, via the note time control 1160, the specified length of time to display the note may be set to a period of time that is longer than the actual duration of the note. This longer specified length of time to display the annotation on playback allows a viewer of the annotated video to read a long annotation that applies to a relatively short portion of the clip. Some embodiments provide the extended period by running the video clip in slow motion during playback during the annotation's specified duration (e.g. the video plays at one third speed if the note time set via note time control 1160 is three times longer than the duration that is set via pop up control 1120).

In some situations, slow motion might not be desirable. For example, if the annotation refers to audio, a slow motion display could distort the audio enough to hide the issue the annotation describes. Accordingly, some embodiments pause the playback at the beginning of the duration over which the annotation applies. For example, if the note time is forty seconds and the duration is ten seconds, on playback, the video would pause for thirty seconds at the beginning of the annotation and then resume playing the clip. The last ten seconds of the specified forty seconds would show the annotation and the playing clip. Some embodiments similarly pause the playback at the end of the duration over which the annotation applies. Some embodiments allow a user to specify any of these or other time extending methods, as desired.

FIGS. 12A-12B illustrate a GUI control for setting a duration of an annotation by adjusting a duration bar on a timeline. FIG. 12A shows a close-up of timeline 125 from FIG. 1. Timeline 125 has a duration bar 1210 on it representing an initial duration of an annotation. FIG. 12B shows a second timeline 1220, showing the results of a change to the duration of an annotation. Timeline 1220 has a duration bar 1230 on representing a duration of the annotation after the duration has been adjusted.

Some embodiments allow a user to click on either side of duration bar 1210 and move the side to the left or right. Moving the left side of duration bar 1210 changes the start time of the annotation. Moving the right side of duration bar 1210 changes the end time of the annotation. The left side of duration bars 1210 and 1230 are in the same place on their respective timelines, indicating that the annotation start time has not been changed. The right side of duration bar 1230 is farther to the right than the right side of duration bar 1210, indicating that the end time for the annotation represented by duration bar 1230 is later than the end time for the annotation represented by duration bar 1210. That is, that the duration of the annotation has been increased. In some embodiments, a user can click on a bar (e.g., click with the right mouse button) to open an entry box for entering start and end times or durations directly.

FIG. 13 illustrates GUI controls for setting an end time of an annotation in some embodiments. The figure shows a clip 1310 with an annotation 1315, a timeline 1320 with a time indicator 1330, a mark annotation end button 1352, and clip navigation controls including: 1) a play button 1340, 2) a pause button 1342, 3) a fast forward button 1344, 4) a rewind button 1346, 5) a slow forward button 1348, and 6) a slow reverse button 1350. Once annotation 1315 of a frame has been made, the GUI allows a director to use the navigation buttons (e.g., to play the clip, fast forward, reverse, etc.) to play the clip, forward, backward, slowly, and/or quickly, to determine at what time in the clip he/she thinks the annotation stops being relevant. Once the clip has reached the determined time (e.g., two minutes and ten seconds into the clip), the director can select the mark annotation end button 1352. The embodiment then sets that time as the end time for the annotation in the clip. Some embodiments also provide a similar button or other control for setting the start of an annotation. Other embodiments provide a single control button for setting the start and end of an annotation.

In some embodiments, multiple controls and techniques are provided for setting the duration. For example, a single embodiment could provide a pop up control for typing in the time, adjustable timeline bars, and clip navigation controls. In some embodiments, a duration of an annotation is not necessarily the amount of time that the annotation is displayed when the clip is actually played, but rather is a measure of time within the clip. That is, if a clip is played at normal speed, then a duration within the clip and the corresponding duration of real time will be the same. However, if the clip is played slowly, or quickly, then the annotation durations will be different in proportion to the playing speed. Accordingly, in some embodiments, duration of an annotation for a video clip is set in terms of a number of frames of the clip.

IV. Methods of Storing Data

Various embodiments employ different methods for saving annotations. The following sentences list the encoding of some embodiments. The different processes listed below not mutually exclusive, so some embodiments provide multiple processes. Some embodiments generate a new video clip that superimposes the annotations over the original video image. Some embodiments use a file format such as matroska video (MKV) that allows multiple video streams to be stored in the same file, but keeps the videos separate. Some embodiments use a video encoding system that allows metadata to be associated with particular frames, groups of frames, or every nth frame (where n is a number) of a video clip. Some embodiments save the annotations as a separate file, synchronized with the video clip. Some embodiments have multiple options for how to save the annotations. Some embodiments activate various processes only in response to a specific command from a user, and some embodiments activate various processes automatically. FIGS. 14-17 illustrate various processes for saving annotations.

Figure 14:
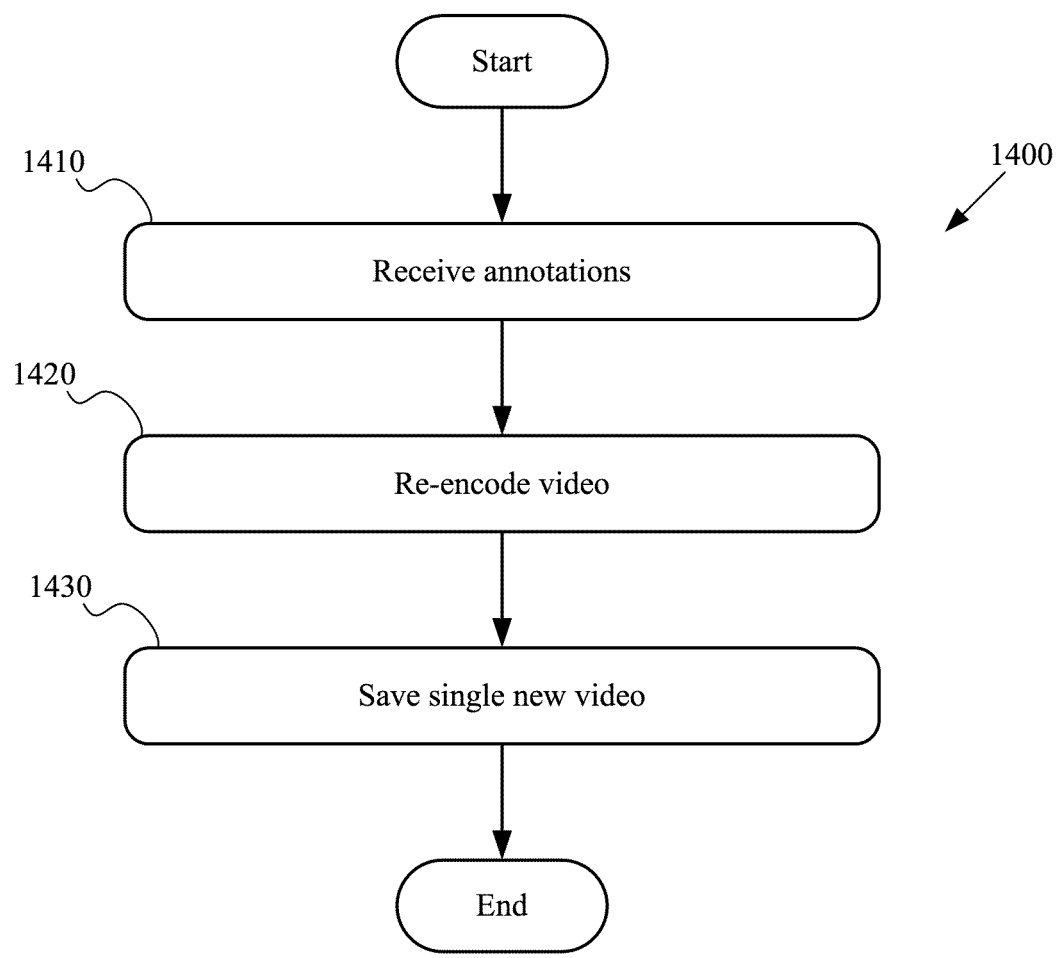
FIG. 14 illustrates a process of some embodiments for saving annotations as part of a video clip.

FIG. 14 illustrates a process 1400 of some embodiments for saving annotations as part of a video clip. Process 1400 saves the annotations and the original video clip as a single new video clip with the annotations superimposed on the original clip. This method has the advantage of ease of distribution. Once the annotated clip has been saved, the annotations become an integral part of the clip. The clip will be playable in any media player capable of decoding the video format in which the combined clip is saved. That is, anyone with a viewer for that type of video clip will be able to see the annotations in the clip.

Process 1400 starts (at 1410) by receiving annotations. Once there are annotations, the process 1400 can re-encode (at 1420) the video stream with the annotations superimposed on the images in the re-encoded stream. In some embodiments, the re-encoding is performed by decoding each frame in turn, overwriting pixels of the decoded frame with pixels of the annotation and then re-encoding the frame (at 1420). The process 1400 then saves (at 1430) the re-encoded video stream.

Figure 15:
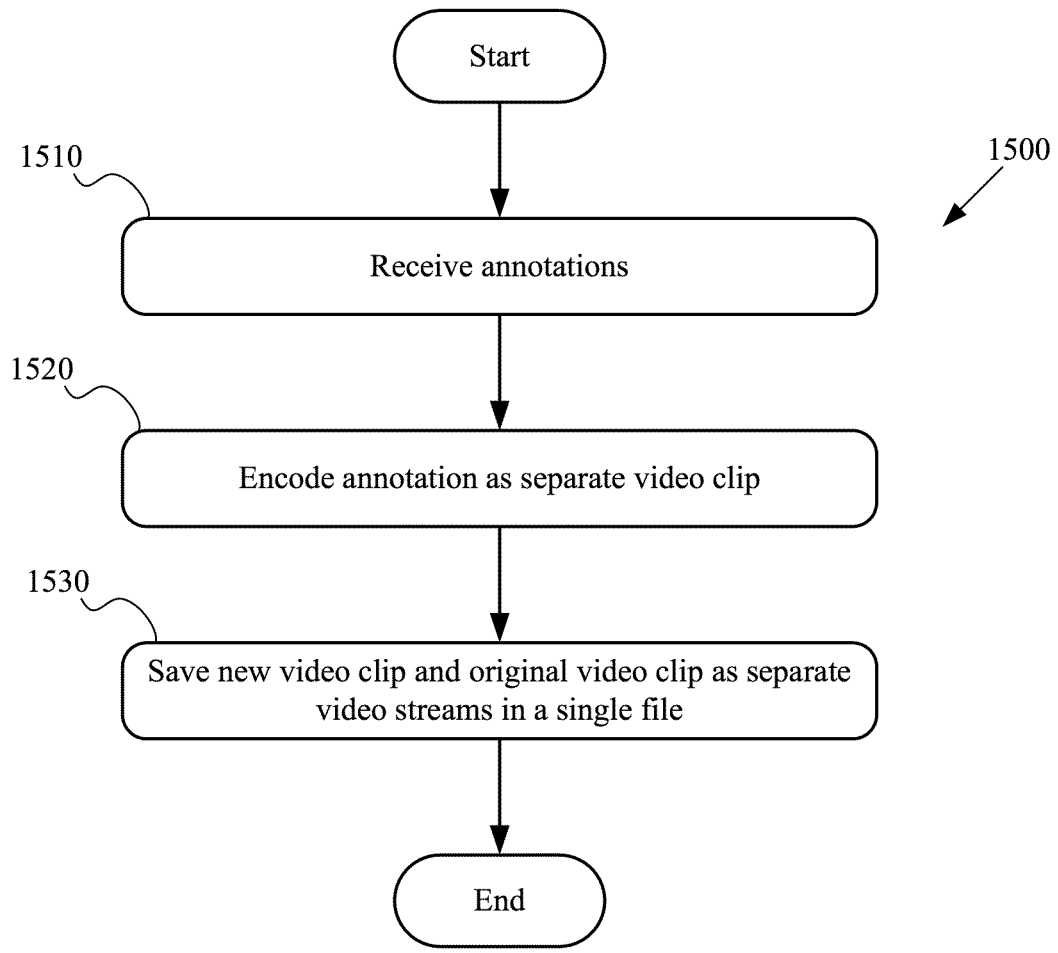
FIG. 15 illustrates a process of some embodiments for saving annotations as a new video clip in the same file as an original video clip.

FIG. 15 illustrates a process 1500 of some embodiments for saving annotations as a new video clip in the same file as an original video clip. Process 1500 saves the annotations and the video clip as multiple video clips. This method has the advantage that the original video clip remains intact, and still provides some ease of distribution. Because there are non-proprietary formats for saving multiple video streams in a single file, the annotations can be viewed by anyone with a viewer capable of superimposing one video stream over another. This system also has the advantage that multiple layers of annotations are possible. For example, one video stream could contain the original clip, a second stream could contain instructions for technicians who edit colors, while a third stream could contain instructions for technicians who edit zooming and panning. Once the annotated clip has been saved, the annotations become part of the same file and will not be accidentally separated. Some embodiments activate this process only in response to a specific command from a user, and some embodiments activate this process automatically.

Process 1500 starts (at 1510) by receiving annotations. Once annotations have been received, the process 1500 encodes the annotations as one or more video streams (at 1520). In other words, the process 1500 generates a video clip of the annotations themselves, such as a video with transparent pixels everywhere other than the annotated locations. The process 1500 then saves (at 1530) the video streams of the annotations in a file along with the original video stream.

Figure 16:
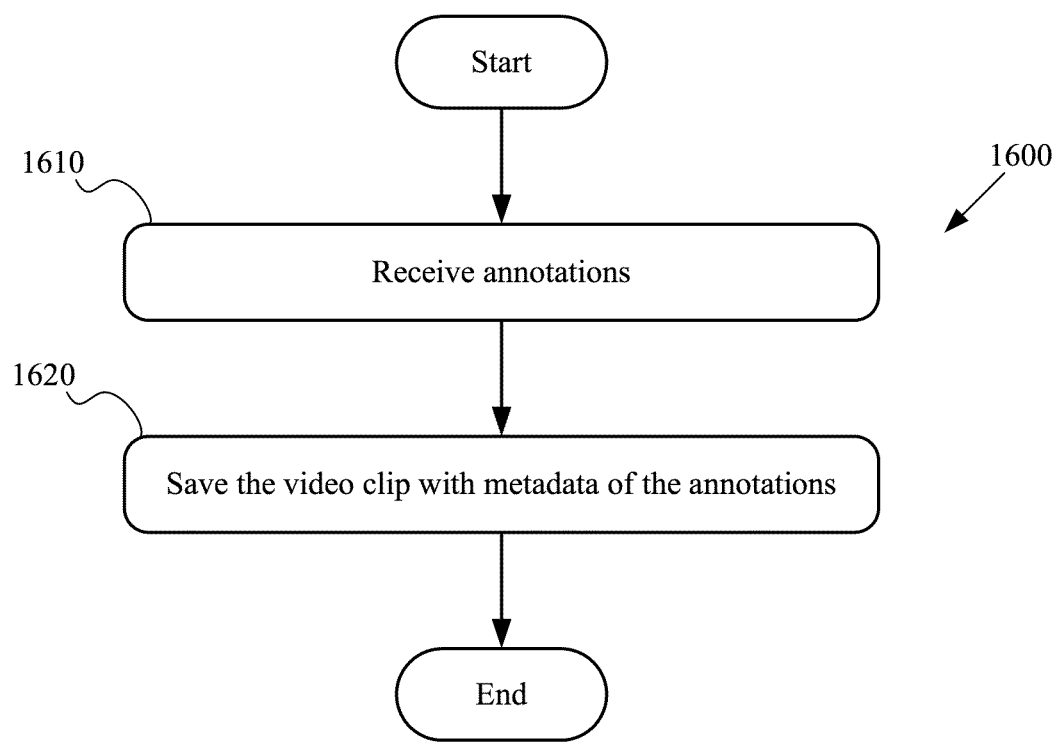
FIG. 16 illustrates a process of some embodiments for saving annotations as metadata of a video clip.

FIG. 16 illustrates a process 1600 of some embodiments for saving annotations as metadata of a video clip. Process 1600 saves the annotations as metadata in a file with the video clip. In some embodiments, the metadata stored in the file includes the annotation content itself (e.g., text annotations), the start time of the annotation, the end time of the annotation, and/or the duration of the annotation.

This process has the advantage that the original video clip remains intact. The system also maintains the annotations in a form that allows them to be edited later. All the annotations are available in the file and can be retrieved in the same form as they were originally created. For instance, when editing the file, the director may search the metadata for text annotations, as described with reference to FIG. 9. However, distribution of such a file is more difficult than distribution of the files created by processes 1400 and 1500 of FIGS. 14 and 15, respectively, as the metadata can only be read by a program designed to access that particular kind of metadata (e.g., the file may be stored as a Quicktime® file with metadata that may be read by Quicktime Player®).

Process 1600 starts (at 1610) by receiving annotations. Once there are annotations, the process 1600 saves (at 1620) the annotations as metadata with the video clip. In some embodiments, the metadata is associated with one or more frames of the video clip in a group of frames of the video clip. In other embodiments, the metadata is associated with every nth frame (where n is a number), such as every tenth frame. Storing data every nth frame could be used for video encoding systems that provide a full frame every nth frame and updating frames between the full frames. Some embodiments may store metadata only on full frames.

Figure 17:
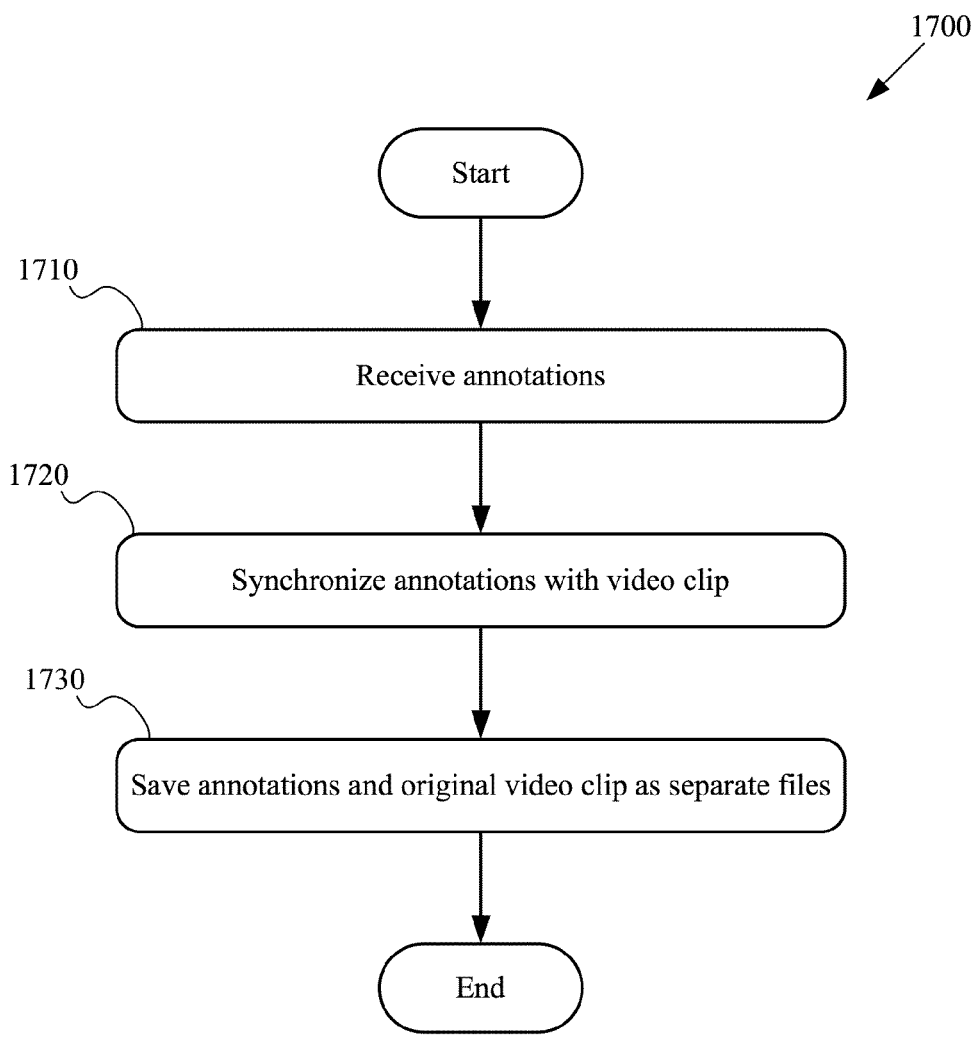
FIG. 17 illustrates a process of some embodiments for saving annotations as a separate file from a video clip.

FIG. 17 illustrates a process 1700 of some embodiments for saving annotations as metadata in a separate file from a video clip. The separate file has a time index that allows it to be synchronized (at 1720) with the video clip. This method also has the advantage that the original video clip remains intact. The system also maintains the annotations in a form that allows them to be edited later. All the annotations are available in the separate file and can be retrieved in the same form as they were originally created. However, the separate file can only be played by a program designed to access that particular kind of file.

Process 1700 starts (at 1710) by receiving annotations. Once the annotations are received, the process 1700 saves (at 1730) the annotations as a separate file with a time index for synchronizing it with the video clip.

Embodiments that store the annotation data separately from the original video clip (e.g., embodiments described with reference to FIG. 17) use various data structures for storing the annotations. FIG. 18 illustrates two such data structures 1810 and 1820 used by some embodiments to store annotations for a content file 1830 that is separate from the original video clip.

Data structure 1810 contains a reference 1812 to the content file, a start time 1814 of the annotation, an end time 1816 of the annotation (or a duration of the annotation), and the contents of the annotation 1818. The reference 1812 to the content file identifies the video file to which the annotations apply, for example, a file location and file name for a video file 1830. The start time 1814 identifies the time in the video file at which the annotation begins to apply (e.g. the first frame that the annotation applies to). Given a start time 1814 of an annotation, the duration can be calculated from the end time or vice versa. Accordingly the data structure contains either the end time 1814 (or duration) which identifies the time in the video file at which the annotation stops applying. In data structure 1810, the contents of the annotation 1818 (e.g. the image, or the words entered by the user) are part of data structure 1810 itself.

In some embodiments, the contents of the annotation 1818 include the location of the annotation. For example, if the annotation is a text box with a particular corner located fifty pixels from the top of a frame and thirty pixels from the left edge of the frame, the location of the annotation could be stored as the numbers fifty and thirty. The rest of the details, e.g., that the numbers are in pixels, relative to the top and left of the frame, and which corner of the text box is at that location, would be preset into the annotation application. Any number of conventions could be used for that data, including storing the location within the display area rather than within the frame.

In embodiments that allow annotations to be outside the frame of the video clip (e.g., beneath the display area), the stored location information would indicate that the annotation was outside the frame. In some embodiments, graphical annotations provide the graphical information in graphics boxes. The annotation contents in those embodiments store the location of the graphics box.

In contrast to data structure 1810, data structure 1820 contains a reference 1828 to external annotation content 1840. This reference may contain a file name and path information for a file along with information to identify where the annotation content for that annotation is stored in the file. For example, a single file of annotations may contain multiple annotations. In some embodiments, the location of the annotation is stored in the annotation data structure. In other embodiments, the location of the annotation is stored in the external file.

Various reasons exist for keeping the content of the annotations separate from the pointers. For example, graphical annotations may take up a large amount of storage space. In such a scenario, a video file with the data structure 1820 stored as metadata would be much larger if the annotation content were stored in the data structure 1820 itself.

Some embodiments use both types of data structures. For example, an embodiment might store text annotations in the data structure for that annotation, but store graphical annotations in a separate file.

V. Computer System

Figure 19:
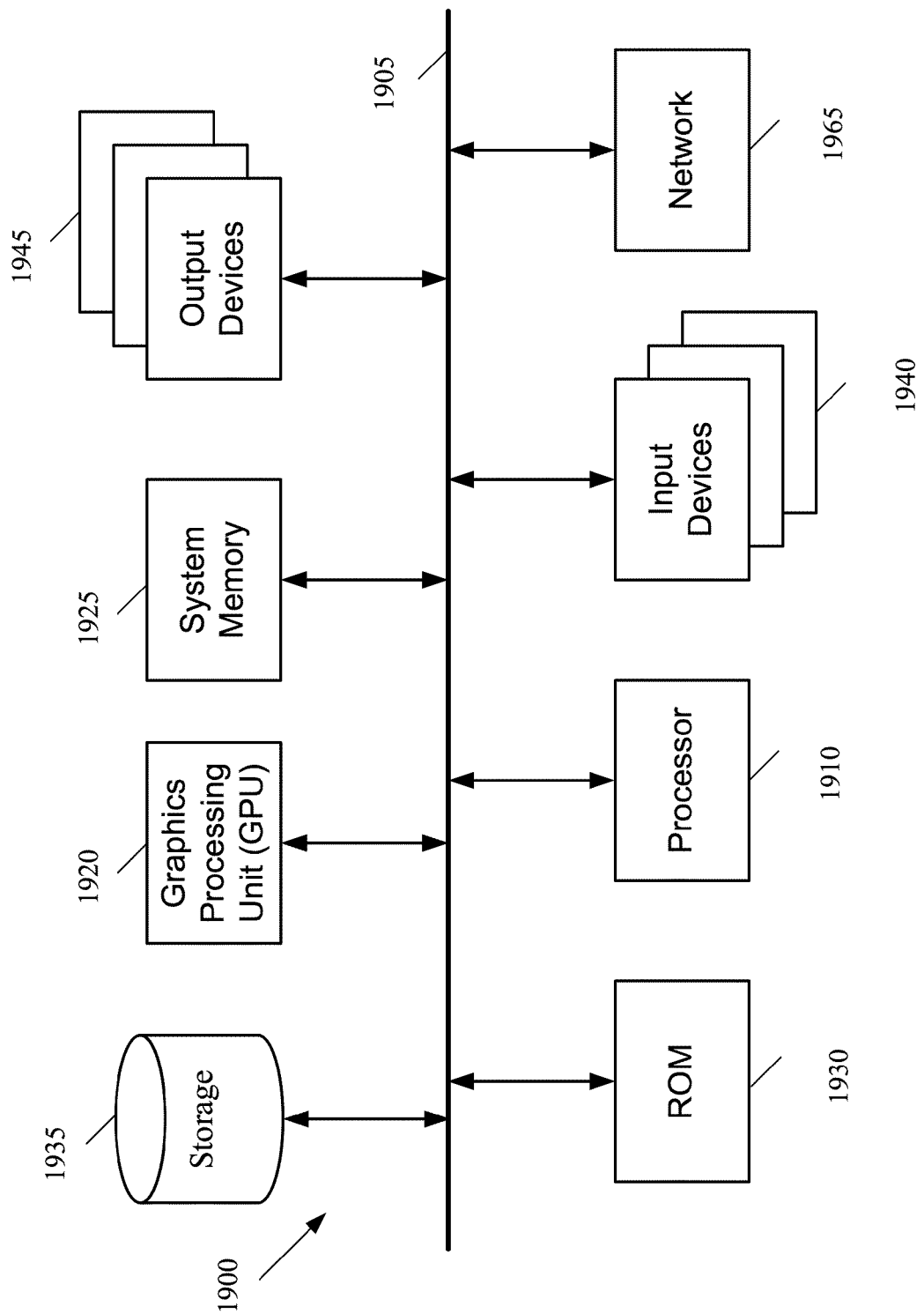
FIG. 19 illustrates a computer system with which some embodiments of the invention are implemented.

FIG. 19 illustrates a computer system with which some embodiments of the invention are implemented. Such a computer system includes various types of computer readable mediums and interfaces for various other types of computer readable mediums. Computer system 1900 includes a bus 1905, a processor 1910, a graphics processing unit (GPU) 1920, a system memory 1925, a read-only memory 1930, a permanent storage device 1935, input devices 1940, and output devices 1945.

The bus 1905 collectively represents all system, peripheral, and chipset buses that communicatively connect the numerous internal devices of the computer system 1900. For instance, the bus 1905 communicatively connects the processor 1910 with the read-only memory 1930, the GPU 1920, the system memory 1925, and the permanent storage device 1935.

From these various memory units, the processor 1910 retrieves instructions to execute and data to process in order to execute the processes of the invention. Some instructions are passed to and executed by the GPU 1920. The GPU 1920 can offload various computations or complement the image processing provided by the processor 1910. In some embodiments, such functionality can be provided using CoreImage's kernel shading language.

The read-only-memory (ROM) 1930 stores static data and instructions that are needed by the processor 1910 and other modules of the computer system. The permanent storage device 1935, on the other hand, is a read-and-write memory device. This device is a non-volatile memory unit that stores instructions and data even when the computer system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, or ZIP® disk, and its corresponding disk drive) as the permanent storage device. Like the permanent storage device 1935, the system memory 1925 is a read-and-write memory device. However, unlike storage device 1935, the system memory is a volatile read-and-write memory, such a random access memory (RAM). The system memory stores some of the instructions and data that the processor needs at runtime. In some embodiments, the invention's processes are stored in the system memory 1925, the permanent storage device 1935, and/or the read-only memory 1930.

The bus 1905 also connects to the input and output devices 1940 and 1945. The input devices enable the user to communicate information and select commands to the computer system. The input devices 1940 include alphanumeric keyboards and pointing devices (also called "cursor control devices"). The input devices 1940 also include audio input devices (e.g., microphones, MIDI musical instruments, etc.).

The output devices 1945 display images generated by the computer system. For instance, these devices display a GUI. The output devices include printers and display devices, such as cathode ray tubes (CRT) or liquid crystal displays (LCD).

Finally, as shown in FIG. 19, bus 1905 also couples computer 1900 to a network 1965 through a network adapter (not shown). In this manner, the computer can be a part of a network of computers (such as a local area network ("LAN"), a wide area network ("WAN"), or an Intranet, or a network of networks, such as the internet. For example, the computer 1900 may be coupled to a web server (network 1965) so that a web browser executing on the computer 1900 can interact with the web server as a user interacts with a GUI that operates in the web browser.

Any or all components of computer system 1900 may be used in conjunction with the invention. For instance, in some embodiments the execution of the frames of the rendering is performed by the GPU 1920 instead of the CPU 1910. Similarly, other image editing functions can be offloaded to the GPU 1920 where they are executed before the results are passed back into memory or the processor 1910. However, a common limitation of the GPU 1920 is the number of instructions that the GPU 1920 is able to store and process at any given time. Therefore, some embodiments adapt instructions for implementing processes so that these processes fit onto the instruction buffer of the GPU 1920 for execution locally on the GPU 1920. Additionally, some GPUs 1920 do not contain sufficient processing resources to execute the processes of some embodiments and therefore the CPU 1910 executes the instructions. One of ordinary skill in the art would appreciate that any other system configuration may also be used in conjunction with the present invention.

As mentioned above, the computer system 1900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. For example, some embodiments allow annotations of clips in different audio and/or video encoding protocols, such as MP3, MPEG, AVI, or any other video or audio encoding protocol. Furthermore, some embodiments allow annotations for multiple images displayed as a slide show. In some such embodiments, the contents of the slide show (e.g., which images are in the slide show and the order of the images) are determined by an existing list. In other embodiments, the annotating application allows a user to select images for the slide show, set an order for the images to display, and annotate one or more images. Thus, one of ordinary skill in the art would understand that the invention is not to be limited by the foregoing illustrative details, but rather is to be defined by the appended claims.

We claim:

1. A non-transitory computer-readable medium storing a computer program for execution on a device, the computer program comprising sets of instructions for displaying a graphical user interface (GUI), said GUI comprising:

a display area for displaying at least one video clip;
a control for making handwritten annotations comprising alphanumeric annotations and non-alphanumeric graphically drawn annotations for a displayed video clip; and
a timeline comprising at least one track for placing clip representations comprising representations of media clips and representations of annotation clips, said timeline for arranging a plurality of media clips for compositing, wherein a representation of a particular annotation is displayed in the timeline overlain on a representation of a media clip to which the particular annotation applies, wherein the duration of the particular annotation is adjustable by dragging an edge of the representation of the particular annotation.

2. The non-transitory computer-readable medium of claim 1, wherein said display area displays the annotations made for the displayed video clip by superimposing the annotations over the displayed video clip as the video clip is being displayed in the display area.

3. The non-transitory computer-readable medium of claim 1, wherein each alphanumeric annotation is expressed in terms of characters stored by the device while each non-alphanumeric graphically drawn annotation is generated by the computer program in response to input for drawing the non-alphanumeric graphically drawn annotation.

4. The non-transitory computer readable medium of claim 1, wherein the non-alphanumeric graphically drawn annotations are made through an input device that is not a keyboard.

5. For a device, a method for displaying a graphical user interface (GUI), the method comprising:
displaying a display area having at least one video clip;
providing a control for making handwritten annotations comprising alphanumeric annotations and non-alphanumeric graphically drawn annotations for a displayed video clip;
displaying a timeline comprising at least one track for placing clip representations comprising representations of media clips and representations of annotation clips, said timeline for arranging a plurality of media clips for compositing: and
displaying a representation of a particular annotation in the timeline overlain on a representation of a media clip to which the particular annotation applies, wherein the duration of the particular annotation is adjustable by dragging an edge of the representation of the particular annotation.

6. The method of claim 5, wherein the non-alphanumeric graphically drawn annotations are received through an input device that is not a keyboard.

7. The method of claim 5, wherein the display area displays the annotations made for the displayed video dip by superimposing the annotations over the displayed video dip as the video clip is being displayed in the display area.

8. The method of claim 5, wherein each alphanumeric annotation is expressed in terms of characters stored by the device while each non-alphanumeric graphically drawn annotation is generated by the computer program m response to input for drawing the non-alphanumeric graphically drawn annotation.

9. An electronic device comprising:
a set of processing units; and
a non-transitory computer-readable medium storing a computer program for execution by at least one of the processing units, the computer program comprising sets of instructions for displaying a graphical user interface (GUI), said GUI comprising:
a display area for displaying at least one video clip;
a control for making handwritten annotations comprising alphanumeric annotations and non-alphanumeric graphically drawn annotations for a displayed video clip; and
a timeline comprising at least one track for placing clip representations comprising representations of media clips and representations of annotation clips, said timeline for arranging a plurality of media clips for compositing, wherein a representation of a particular annotation is displayed in the timeline overlain on a representation of a media clip to which the particular annotation applies, wherein the duration of the particular annotation is adjustable by dragging an edge of the representation of the particular annotation.

10. The electronic device of claim 9, wherein the non-alphanumeric graphically drawn annotations are made through an input device that is not a keyboard.

11. The electronic device of claim 9, wherein the display area displays the annotations made for the displayed video clip by superimposing the annotations over the displayed video clip as the video clip is being displayed in the display area.

12. The electronic device of claim 9, wherein each alphanumeric annotation is expressed In terms of characters stored by the device while each non-alphanumeric graphically drawn annotation is generated by the computer program in response to input for drawing the non-alphanumeric graphically drawn annotation.

* * * * *